(12) United States Patent
Cunningham

(10) Patent No.: US 6,760,184 B1
(45) Date of Patent: Jul. 6, 2004

(54) COMPACT SERVO PATTERN OPTIMIZED FOR M-R HEADS

(75) Inventor: Earl Albert Cunningham, Rochester, MN (US)

(73) Assignee: Hitachi Global Storage Technologies (NL)

( * ) Notice: Subject to any disclaimer, the term of this patent is extended or adjusted under 35 U.S.C. 154(b) by 0 days.

(21) Appl. No.: 09/499,136

(22) Filed: Feb. 7, 2000

Related U.S. Application Data

(62) Division of application No. 08/910,968, filed on Aug. 7, 1997, now Pat. No. 6,057,977.

(51) Int. Cl.[7] .............................................. G11B 5/596
(52) U.S. Cl. ................................................... 360/77.08
(58) Field of Search ........................... 360/77.08, 77.11, 360/75

(56) References Cited

U.S. PATENT DOCUMENTS

| | | | | |
|---|---|---|---|---|
| 3,840,893 A | | 10/1974 | Jacoby et al. ................. | 360/77 |
| 4,855,028 A | * | 8/1989 | Jagannathan et al. .... | 204/180.2 |
| 5,210,662 A | * | 5/1993 | Nishijima ................ | 360/77.04 |
| 5,309,299 A | | 5/1994 | Crossland et al. ....... | 360/77.01 |
| 5,442,498 A | | 8/1995 | Cheung et al. .......... | 360/77.08 |
| 5,448,430 A | | 9/1995 | Bailey et al. ............. | 360/77.12 |
| 5,453,887 A | | 9/1995 | Negishi et al. ............ | 360/77.1 |
| 6,268,976 B1 | * | 7/2001 | Carlson et al. ................ | 360/75 |

FOREIGN PATENT DOCUMENTS

| | | | | |
|---|---|---|---|---|
| JP | 56-22267 | 3/1981 | ........... | G11B/21/10 |
| JP | 57-123525 | 8/1982 | ............ | G11B/5/58 |
| JP | 59-113572 | 6/1984 | ........... | G11B/21/02 |
| JP | 61-90318 | 5/1986 | ............ | G11B/5/58 |
| JP | 63-32772 | 2/1988 | ........... | G11B/21/10 |
| JP | 01/37774 | 2/1989 | ........... | G11B/21/10 |

* cited by examiner

Primary Examiner—David Hudspeth
Assistant Examiner—Dan I Davidson

(57) ABSTRACT

A disk drive system has a servo pattern with bursts that are recorded without multiple passes per burst and without trimming, so that the servo pattern bursts have the same width as the data tracks. The servo write steps occur in partial data track pitch (DTP) increments. A magneto-resistive (M-R) head is used to both record the servo pattern and transduce it. In a two-frequency system, relative gain calibration is performed using AGC circuitry to first calibrate one frequency and then the other. The resulting servo position error sensing (PES) signal has improved linearity and is simpler to write.

39 Claims, 12 Drawing Sheets

| COL.# | (1) | (2) | (3) | (4) | (5) | (6) | (7) | (8) | (9) |
|---|---|---|---|---|---|---|---|---|---|
| FCT | A−C | A−B+C−D | (2)/15 | (1)+(3) | A+B+C+D | (5)/384 | (4)*(6) | LIN | (7)−(8) |
| OFF TRK | | | | | | | | | |
| −.25 | 912 | 0 | 0 | 192 | 384 | 1.0000 | 192 | 192 | 0 |
| −.20 | 160 | −62 | −4 | 156 | 382 | 1.0052 | 157 | 154 | −3 |
| −.15 | 128 | −120 | −8 | 120 | 376 | 1.0213 | 123 | 115 | −8 |
| −.10 | 94 | −168 | −11 | 83 | 372 | 1.0323 | 86 | 77 | −9 |
| −.05 | 56 | −200 | −13 | 43 | 376 | 1.0213 | 45 | 38 | −7 |
| 0 | 14 | −212 | −14 | 0 | 384 | 1.0000 | 0 | 0 | 0 |
| +.05 | −32 | −200 | −13 | −45 | 392 | 0.9796 | −44 | −38 | +6 |
| +.10 | −78 | −168 | −11 | −89 | 396 | 0.9697 | −86 | −77 | +9 |
| +.15 | −120 | −120 | −8 | −128 | 392 | 0.9796 | −125 | −115 | +10 |
| +.20 | −158 | −62 | −4 | −162 | 386 | 0.9948 | −161 | −154 | +7 |
| +.25 | −192 | 0 | 0 | −192 | 384 | 1.0000 | −192 | −192 | 0 |

*FIG. 12*

COMPACT SERVO PATTERN OPTIMIZED FOR M-R HEADS

REFERENCE TO PARENT APPLICATION

This application is a divisional of U.S. Ser. No. 08/910,968, filed on Aug. 7, 1997 by Earl Albert Cunningham now U.S. Pat. No. 6,057,977, and entitled, "Compact Servo Pattern Optimized for M-R Heads," which is hereby incorporated by reference.

BACKGROUND OF THE INVENTION

1. Field of the Invention

This invention relates generally to magnetic head servo control systems and, more particularly, to disk drive position control systems that determine the location of a head relative to disk tracks.

2. Description of the Related Art

In a conventional computer disk drive sector servo system, servo information is stored in servo bursts recorded in a magnetic storage material as a series of magnetic flux reversals. When the disk rotates beneath a read/write head, a magnetic read element of the head senses the changes in flux and produces a varying electrical readback signal. The electrical signal can be decoded to indicate the head position relative to tracks of the disk. In this way, the read/write head can be accurately positioned relative to data tracks of the disk for data read and write operations.

Each disk surface of a sector servo disk includes concentric or spiral tracks that are divided into sectors having a short servo track information area followed by a customer data area. The servo track information area typically includes a sector mark, track identification data, and a servo burst pattern. The sector mark indicates that servo information immediately follows in the track.

FIG. 1 shows a conventional disk drive system 20 having a rotatable storage disk 22 and a rotary arm 24 that is moved by a servo motor 26. The read/write head 28 is suspended over the disk at one end of the arm. The disk 22 has concentric tracks 30 and is divided into sectors that are defined by circumferentially spaced sector mark fields 32, of which two are shown. It should be understood that conventional disk drives typically contain approximately one hundred sectors per track and more than 5000 data tracks; fewer are indicated in FIG. 1 for simplicity. Customer data is recorded by a user into the track spaces 33 between the sector marks. The read/write head 28 produces a readback signal when reading information from the disk 22 and receives a write signal when recording information onto the disk surface. The readback signal and write signal are carried to and from the head 28 over a data cable 34, which is coupled to a disk drive controller 36.

When the read/write head 28 is over servo information recorded into the disk, the disk controller 36 receives position information and in response generates a position error sensing (PES) signal that indicates the position of the head relative to a disk track. The PES signal is used by the disk drive controller to generate servo commands that control the servo motor 26 and are provided over a servo line 38 to maintain the head in a position centered above one of the tracks.

FIG. 2 shows the read/write head 28 of FIG. 1 in greater detail, shown in an exploded view providing better visualization of the component. The head 28 comprises what is commonly referred to as a magneto-resistive (M-R) head, which includes an M-R read element 40 and an inductive write element 42. The M-R read element 40 is placed on a non-magnetic gap material 44 located on a magnetic shield piece 45. The write element of the head includes a magnetic gap 46 containing a magnetic pole piece and electromagnetic coils (not shown in FIG. 2). A second non-magnetic gap material 47 is placed over the M-R read element 40 and leads. The write element is placed on the second gap material 47, which is over the MR read element.

Two electrical wires 48, 50 are connected to read contacts 52, 54 respectively, and carry the sensed readback signal from the M-R read element to signal processing circuitry 56. The combined read/write head shown in FIG. 2 permits a single head assembly to include both read and write elements and thereby simplifies production and design.

The disk controller 36 controls the servo motor 26 (FIG. 1) to maintain the read/write head 28 above a magnetic track 60 of the disk 22 in response to the head readback signal. As noted above, the head readback signal is generated from sensed servo pattern bursts recorded in the disk track 60. The servo pattern bursts are recorded in the disk tracks as magnetic field transitions that extend across the width of the disk tracks.

FIG. 3 shows a conventional servo burst pattern comprising an A, B, C, D quadrature burst pattern that is repeated for each servo sector. The bursts are part of the information following the sector mark (FIG. 1). Each burst of the quad-burst servo pattern shown in FIG. 3 is typically made up of two parts, each being one-half of a data track pitch (DTP), as indicated by the data track numbers along the left side of the drawing showing respective data track centerlines. It should be understood that other servo pattern widths are possible. For example, many conventional disk drive systems utilize servo patterns that are two-thirds the width of a data track. In addition to quadburst servo patterns, it is also common to use dual burst patterns, which generally comprise only the A and C servo bursts of the quad-burst pattern illustrated in FIG. 3.

The servo pattern bursts A, B, C, and D are produced by energizing write coils in the read/write head 28 during a servo writing operation before final disk drive assembly. When the write coils of the read/write head are energized, they do not record flux transitions that correspond exactly to the actual width of the track. To the contrary, the flux transitions typically span about 60% to 90% of the track pitch, depending on the tolerance of the width of the write element and the recorded density. The write coils cannot record a full-width pattern because the width of the write element is less than the data track pitch for data handling purposes. Therefore, to get a servo pattern with bursts that span substantially the full width of a track, it is necessary to make multiple passes.

The servo pattern bursts are typically produced with a two-step servo write process, as shown in FIG. 3. The process steps are generally referred to as "move and write" because the read/write head is moved, a portion of the servo burst is written to the disk, and the process is repeated. When the read/write head is moved, it is moved radially a predetermined distance that is typically one-half DTP. After the second move and write step, the second portion of the servo pattern burst is recorded.

Because the magnetic flux transitions written by the write element into the disk are usually greater than one-half DTP, the total width of the A burst is now greater than one data track width (DTW), proper size is obtained on the third pass by erasing part of the burst at the next half DTP position, which is commonly called trimming. Thus, with each pass that writes part of the servo pattern, part of the previously written flux transitions are erased or written over. It should be appreciated that the two burst halves making up the servo pattern burst must be aligned radially (that is, the flux transitions must be oriented along the same radial line from the disk center) so the transitions are in phase. The alignment requirement restricts the servo frequency to be significantly lower than the data frequency, which reduces the servo signal-to-noise ratio.

Typically, the read/write head that will be used in reading and writing customer data after the disk has been sold is the same head as the read/write head used in producing the servo pattern bursts. Accordingly, the read/write head is generally optimized for reading and writing customer data, not servo patterns. As a result, the read/write head is generally somewhat more narrow that the DTP to allow for write element size tolerance and servo track following imperfections. Typically, the write element of a read/write head is approximately 85% of DTP and the effective read width of the M-R read element is approximately 50% of DTP. Using a narrow read element causes non-linearity in the response of the read/write head when reading the servo information. The non-linearity can be reduced somewhat by using narrow servo write steps; hence, many systems today use servo write steps that are one-third DTP, so that resulting servo pattern bursts are two-thirds DTP.

Narrow servo write steps mean more steps in the servo writing process. The number of servo writing steps for a five thousand data track disk, for example. increases from 10,000 steps to 15,000 steps if the servo pattern bursts are made more narrow by using one-third servo write steps in place of one-half servo write steps. Thus, there is potentially a 50% increase in servo writing time as a result of increasing the number of servo passes to achieve better servo linearity. and thus more accurate tracking. If the improved accuracy permitted 5% more tracks to be fit into the same recording band, then there would need to be 1575 servo passes. Thus, a 5% capacity increase would need 57.5% more servo writing time.

From the discussion above, it should be apparent that there is a need for a disk drive with a servo pattern that can be written with a reduced number of servo write steps and that provides increased linearity in the readback signal. The present invention fulfills this need.

SUMMARY OF THE INVENTION

The present invention provides a direct access storage device, such as a disk drive system, in which a magneto-resistive (M-R) read/write head transduces a servo pattern having bursts that are recorded without multiple passes per burst and without trimming. This allows the servo burst frequency to be comparable to the data frequency, which improves the signal-to-noise ratio of the readback signal. The servo pattern bursts have a natural width wherein the flux transitions of the servo pattern bursts are the same width as the flux transitions of the customer data, which is somewhat narrower than the write element, and multiple servo write steps for each servo burst are not necessary. The unique processing of the invention takes advantage of the unique read sensitivity of an M-R head to read servo information over a greater width than normally processed. This allows use of the original width spacing of the servo pattern.

In one aspect of the invention, a dual-frequency servo pattern is used for a disk drive such that a first set of servo bursts are recorded, alternating between a first frequency and a second frequency and spaced apart by a pitch equal to that of the data tracks, and a second set of servo bursts are recorded angularly displaced from the first set and radially offset from the first set by a predetermined fraction of a data track pitch (DTP), alternating between the first frequency and the second frequency and spaced apart by a pitch equal to that of the data tracks. The dual-frequency pattern provides a more compact arrangement of the servo pattern bursts while preserving both the reduced write steps needed to produce the pattern and the increased servo position error sensing (PES) signal linearity. While the head may read some of each frequency at the same time, the frequency content is separated by filtering, as previously known in the art.

In another aspect of the invention, gain calibration between the two frequencies is performed using an automatic gain control (AGC) normalization procedure in which the AGC circuitry of the disk drive system is permitted to perform gain control on one data track and then held at a fixed gain equal to the average value. This track is where the largest amplitude burst is known to be of the first frequency. The amplitude is read and saved. The head is then moved to an adjacent data track, where the burst of the maximum amplitude is of the second frequency. The readback signal amplitude received from each respective track (and servo burst frequency) is compared and the relative gain between the two is adjusted so that the readback signal magnitudes are equal. In yet another aspect of the invention, the readback signal comparison is repeated if the gain adjustment exceeds a predetermined chance limit value. This permits the gain of the readback signal to be calibrated so the demodulation circuitry accurately determines the value of the PES signal, without requiring additional calibration patterns or other schemes that might take up disk surface area. Multiple gain values are needed for different heads and radii.

Other features and advantages of the present invention should be apparent from the following description of the preferred embodiment, which illustrates, by way of example, the principles of the invention.

BRIEF DESCRIPTION OF THE DRAWINGS

FIG. 12 is a table that lists function values calculated during PES signal correction processing for linearization in the system of FIG. 6.

DESCRIPTION OF THE PREFERRED EMBODIMENTS

The Single-Frequency Embodiment

Figure 1:
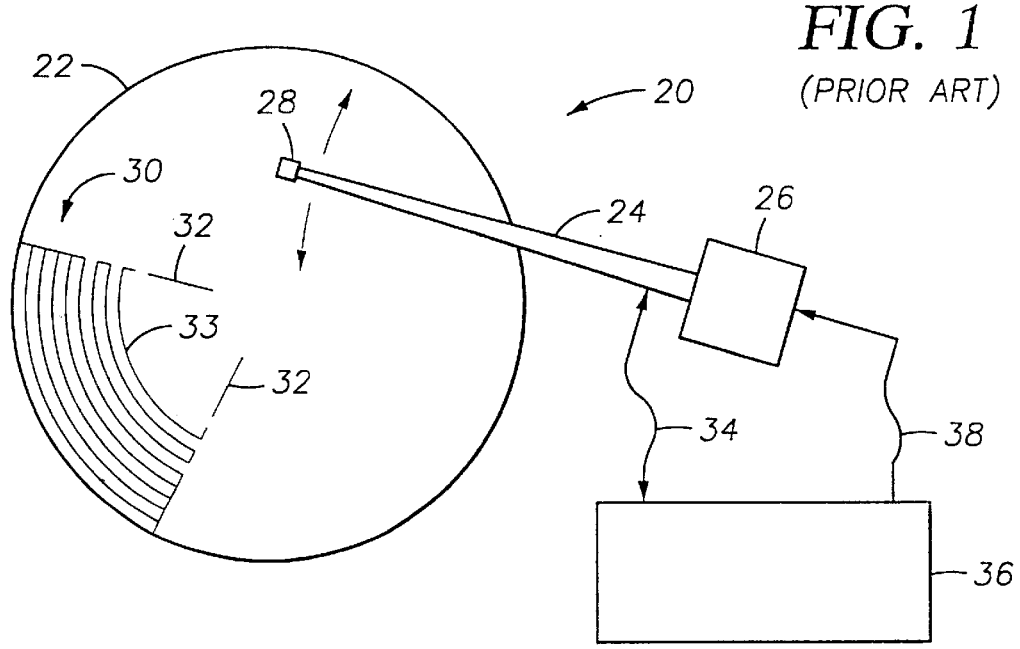
FIG. 1 is a representation of a conventional disk drive system having a sector servo position control system.
Figure 2:
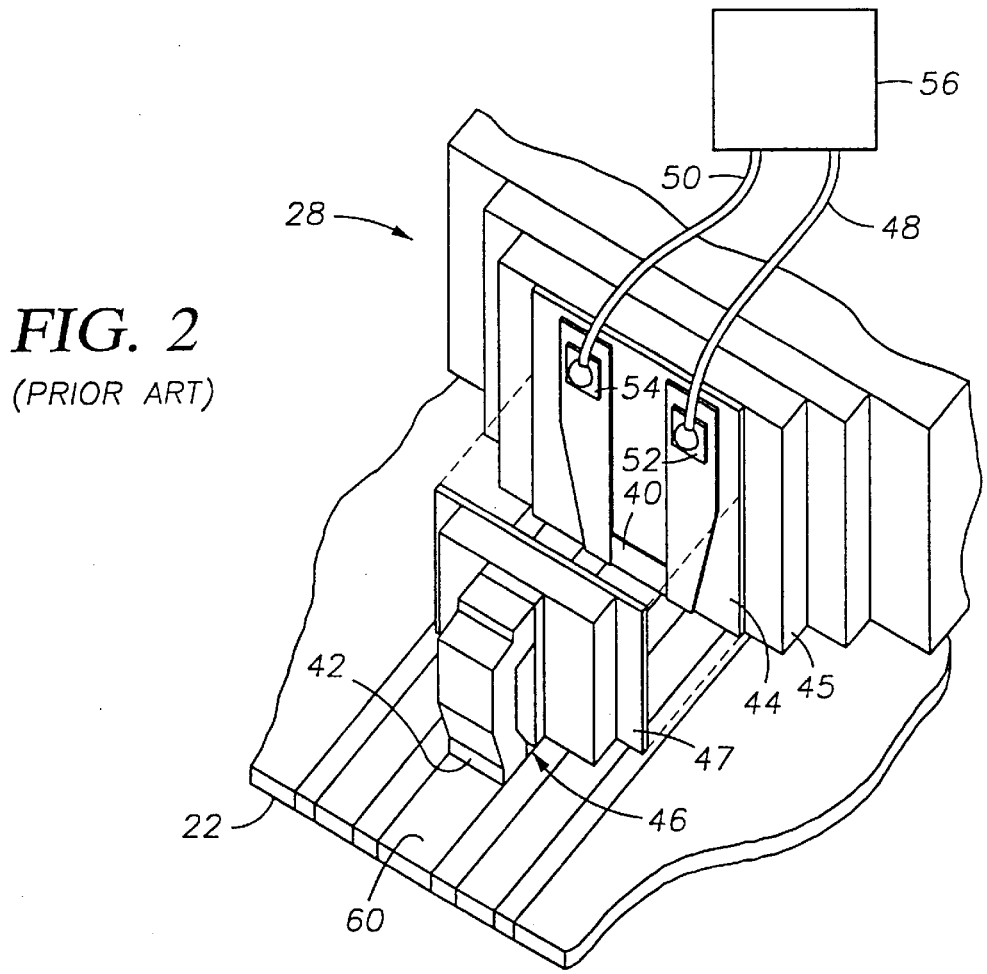
FIG. 2 shows the M-R read/write head of the FIG. 1 disk drive system in greater detail.
Figure 3:
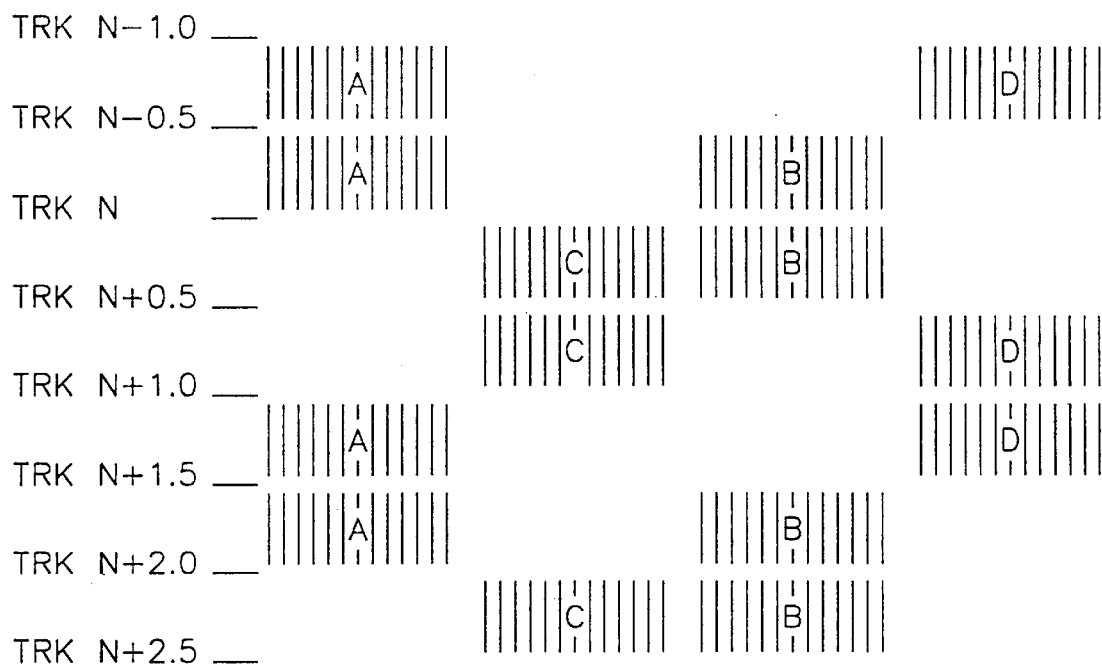
FIG. 3 is a representation of a conventional quad-burst PES pattern recorded on the disk illustrated in FIG. 1, in a vertical orientation with tracks running left to right across the sheet.
Figure 4:
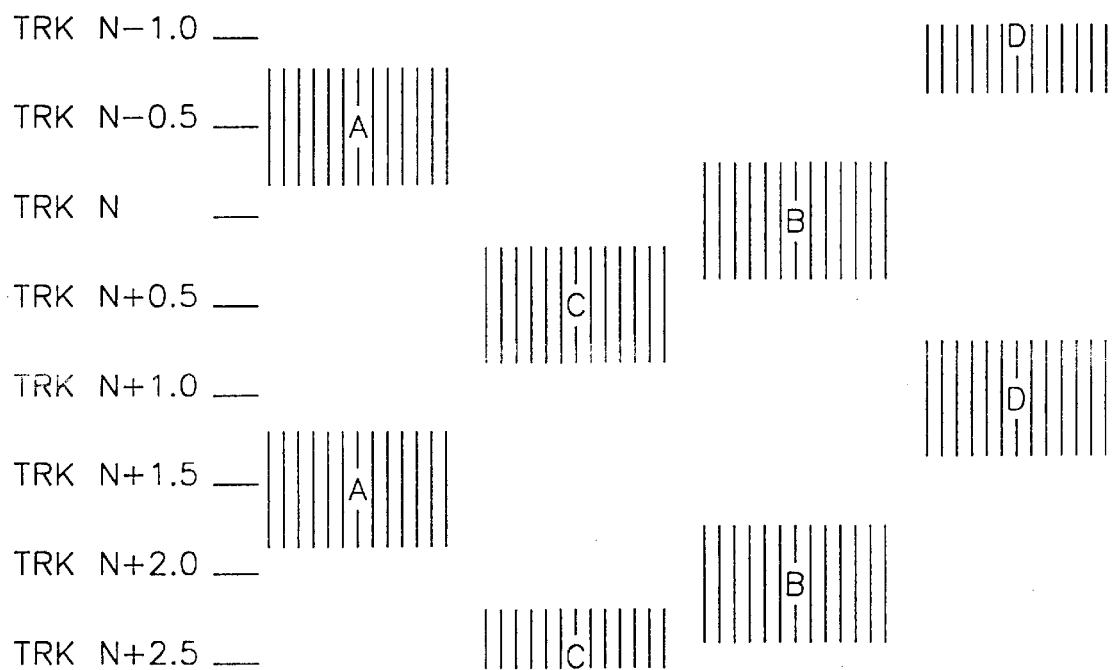
FIG. 4 is a representation of a single-frequency servo pattern in accordance with the present invention.

FIG. 4 shows a servo pattern in accordance with the present invention, which is recorded onto a disk surface of a disk drive direct access storage device (DASD) system such as illustrated in FIG. 1. The servo pattern illustrated in FIG. 4 is a quad-burst pattern with the four bursts labelled A, B, C, and D. The FIG. 4 servo pattern bursts are each recorded on the surface of the disk 22 in a single pass, without trimming, using the same read/write head 28 used for reading and writing customer data, and being of a frequency within the range of frequencies used for data, so the servo pattern bursts have the same width as the data tracks. Erasure or trimming of previous bursts is prevented by turning on the write current only in the positions where each burst is to be written in the final pattern. Therefore, the FIG. 4 servo pattern bursts have a natural width such that the flux transitions of the servo pattern bursts are the same width as the flux transitions of the customer data. Because the read/write head 28 is optimized for customer data, the servo position error sensing (PES) signal generated by the read/write head from the FIG. 4 pattern has improved linearity as compared with the PES generated from conventional multiple-pass servo pattern bursts, because multiple-pass writing leaves some erase bands between the passes, that cause non-linearity in the PES.

More particularly, the width of the servo pattern bursts A, B, C, and D are slightly less than the physical width of the write element, approximately 60% to 65% of a track pitch. The bursts are not trimmed in any erasing process from subsequent passes of the write head, as is the case with conventional patterns. Such natural width servo pattern recording in accordance with the invention provides the widest possible recording width without the phase alignment problems associated with conventional multiple pass burst patterns and achieves sufficient readback signal linearity for accurate position control with reduced PES splicing operations that are otherwise typical with conventional patterns.

In addition, because the servo pattern bursts are written in one pass with the same read/write head used after final assembly, the servo pattern is centered directly under the write element, so that there is no offset such as typically associated with erase bands that are recorded over subsequent servo write passes. This permits any servo pattern burst to be rewritten without disturbing adjacent bursts, so that servo pattern testing, calibration, and rewriting (if necessary) can be done at any time, not just during the initial servo writing process. Moreover, erase bands are known to change width with modulation in disk coercivity, which can cause detected track edge positions to change. That is, with a trimmed pattern, the outer edge of the magnetic erase width of the write head which varies with the head coercivity, determines where the erase band will be. The servo pattern in accordance with the present invention does not have a width that is determined by the outer edge of the erase bands, rather, the width of the pattern is determined by the magnetic width of the write element.

The Dual-Frequency Embodiment

Figure 5:
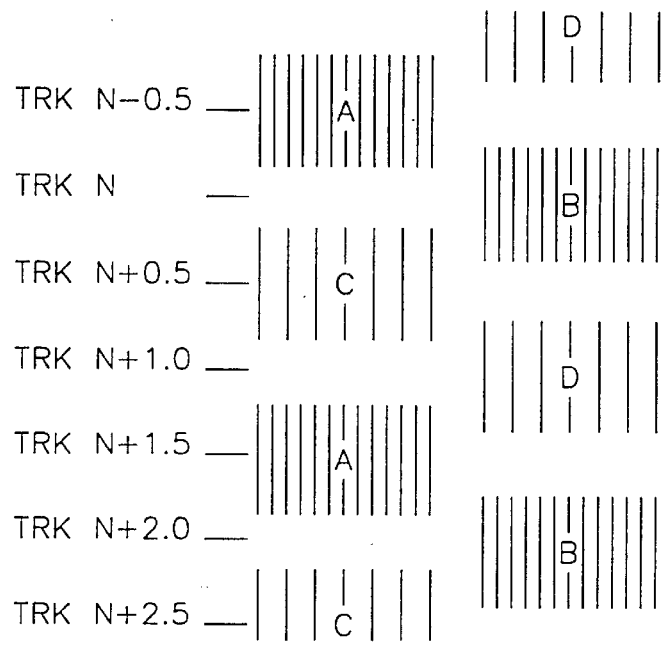
FIG. 5 is a representation of a dual-frequency servo pattern in accordance with the present invention.

FIG. 5 shows a dual-frequency embodiment of a servo pattern constructed in accordance with the present invention. The FIG. 5 pattern provides increased compactness compared with the FIG. 4 pattern and in that regard is preferred. As with the FIG. 4 pattern, the servo bursts of FIG. 5 are written in a single pass, at a natural width equal to that of the data tracks. The FIG. 5 tracks run horizontally, left to right across the sheet, and the magnetic flux transitions of the servo bursts are represented by vertical lines whose spacing indicates frequency. That is, the servo pattern bursts indicated by the labels A and B are recorded at a first frequency and the servo pattern bursts indicated by the labels C and D are recorded at a second frequency. In the illustrated embodiment, the frequencies are recorded at a 2:1 ratio, so that the frequency of the A and B transitions is twice the frequency of the C and D transitions. This frequency ratio is for purposes of convenient illustration only and are should not be taken as the ratio of the preferred embodiment.

Frequency ratios other than 2:1 should provide improved performance. It is preferred that the frequency ratios not be whole multiples of each other, such as 2:1 or 3:1 or 4:2. For example, the frequencies should be fractional multiples of each other, such as 3:2 or 4:3 ratios as in the preferred embodiment. Irrational ratios could be used, such as $\sqrt{2}:1$ or the like. With digital detection and demodulation systems, however, simple real number (fractional) relations provide the simplest filter designs and are preferred. Keeping the two frequencies close together will reduce the amplitude differences encountered due to recorded density, simplifying the gain calibration for the two frequencies. Those skilled in the art will appreciate that balanced against this consideration is the fact that frequencies too closely related will require higher Q-value filters to separate the signal values according to the frequencies, which have longer build-up times and therefore require more disk surface area for the servo patterns.

Disk Drive System

Figure 6:
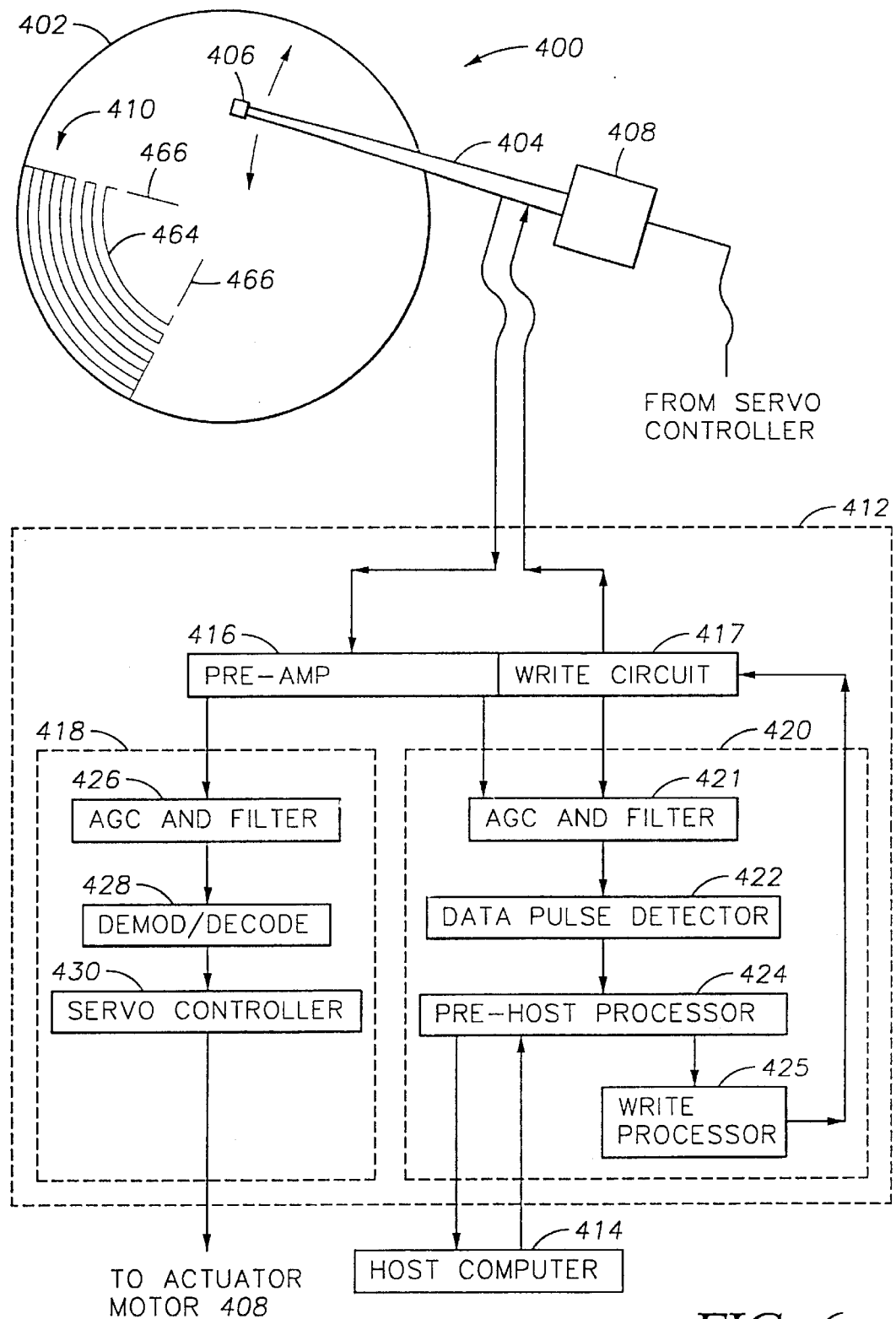
FIG. 6 is a representation of a disk drive system constructed in accordance with the present invention, having a disk on which is recorded the servo pattern of FIG. 4 or FIG. 5.

The "natural width" servo pattern of the present invention is generally implemented in conjunction with a magnetic disk drive system 400, in an arrangement such as that depicted in FIG. 6. The disk drive 400 may include one or more individual disks 402 on which is deposited a magnetic recording material for storing magnetically encoded information. For ease of explanation, only one disk 402 is illustrated in FIG. 6. The disk drive 400 also includes an actuator 404 with a read/write head 406. The position of the actuator 404 is controlled by an actuator motor 408, which pivots the actuator 404, thereby changing the position of the read/write head 406 with respect to concentric tracks 410 of data contained on the disk 402. Although rotary movement of the actuator 404 is depicted for illustrative purposes, the disk drive 400 may alternatively use another positioning scheme, such as linear extension/retraction of an actuator positioned along a radial direction.

The operation of the disk drive 400 is managed by a disk drive controller 412, which also serves as an interface between the disk drive 400 and a host computer 414. The host computer may comprise, for example, a desktop computer, a notebook computer, a mainframe computer, or other digital data processing device for which storage of data on a disk is desired. The controller 412 includes a readback signal pre-amplifier 416 ("pre-amp"), which receives electrical representations of servo patterns sensed by the read/write head 406 from the disk 402. With sector servo positioning, the pre-amp 416 preferably serves a dual purpose by amplifying either data or servo signals, depending on whether the read/write head 406 is positioned over stored customer data or servo patterns, respectively. A write circuit 417 is also provided to supply the read/write head 406 with data signals to be written to the disk 402.

The amplified signal from the pre-amp 416 is directed to two processing channels: a servo channel 418 and a data channel 420. The servo channel 418 generally functions to read servo data from the disk 402 to aid in properly positioning the read/write head 406. The data channel 420 generally reads and writes data to and from the disk 402 in response to requests from the host computer 414 to read or write the data.

With respect to reading data from the disk 402 as part of the data channel 420 operation, the pre-amp 416 amplifies signals provided by the read/write head 406 that correspond to customer data stored on the disk 402. Amplified data signals from the pre-amp 416 are then directed to an automatic gain control (AGC) and filter circuit 421 within the data channel. Then, a data pulse detector 422 forms digital data pulses corresponding to the analog signals provided by the circuit 421. Next, a pre-host processor 424 converts the data pulses into formatted data strings that are specifically compatible with the host computer 414. To write data to the disk 402, the host computer 414 provides data to the pre-host processor 424, which in turn delivers the data to a write processor 425 for formatting. The write processor delivers the formatted data to the write circuit 417, which sends the data to the read/write head 406 for writing to the disk 402.

In contrast to the data channel 420, the servo channel 418 reads servo data from the disk 402 for positioning the read/write head 406. When operating in conjunction with the servo channel 418, the pre-amp 416 amplifies servo signals produced when the read/write head 406 senses servo patterns. The servo channel 418 includes an automatic gain control (AGC) and filter circuit 426, which may comprise any one of various known circuits for automatically adjusting the readback signal gain and filtering it. Next, a demodulator/decoder 428 receives the readback signal and processes the information to derive a position error sensing (PES) signal, which is related to the position of the read/write head 406 with respect to the desired track center and is indicative of the read/write head position error. The PES signal is then used by a servo controller 430 to generate an input signal that, when provided to the actuator 404, controls the position of the read/write head 406. The actuator motor 408 may, in an exemplary embodiment, comprise a voice coil motor.

The servo pattern is recorded into, and read from, tracks across the disk 418. In FIG. 6, circular, parallel lines 464 designate tracks of the disk, which is divided into servo sectors that are represented by radial lines 466. Each servo sector includes a servo information field followed by one or more customer sectors including a customer data identification field and a customer data field. The customer area may also include partial sectors in addition to full data sectors, as used in banded recording. After the servo pattern has been recorded and disk production is complete, a user can record and read the user's customer data from the customer data field using, for example, the system illustrated in FIG. 6.

It should be noted that additional portions of the servo and data branches of the controller in FIG. 6 may be combined to minimize the number of components. This is even more practical with the servo burst patterns at frequencies within the data frequency range, as allowed by the single-pass writing of the servo bursts. Thus, for example, sharing a single AGC and filter may be practical.

Generating the PES Signal

Those skilled in the art will appreciate that the PES signal used for position control is produced by decoding the readback signal generated by the head 406 when it passes over the servo burst patterns A, B, C, D to produce a primary signal P based on:

$$P=A-C,$$

subtracting the respective readback signal A and C magnitudes to form P, and to produce a quadrature signal Q based on:

$$Q=B-D.$$

again subtracting signal magnitudes. The reason for the primary and quadrature notation will be described below. The magnetic transitions that comprise the servo pattern are represented in FIG. 4 and FIG. 5 by vertical bars. The letter within each group of bars represents the servo burst recorded therein. For FIG. 4, one burst is distinguished from another by relative position in a track and relative position to the other bursts. Thus, four separate timing windows can be set up to totally separate the A, B, C, and D signals. For FIG. 5, the four bursts are separated by two timing windows and two frequencies.

Figure 7:
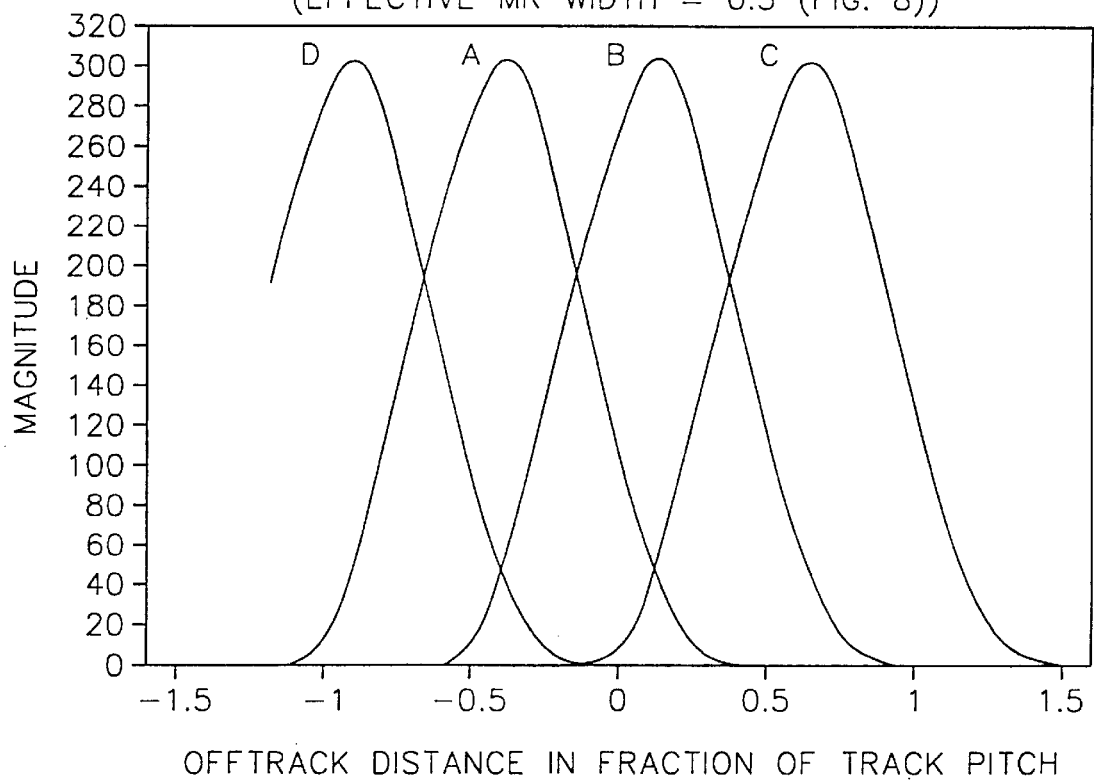
FIG. 7 is a displacement graph of the relative readback signal magnitude as a function of the offtrack distance of the read/write head, for multiple burst servo patterns.

FIG. 7 shows the displacement curves for each of the four servo pattern bursts illustrated in FIG. 5 (the displacement curves could just as well be generated from the FIG. 4 pattern). The effective width of the M-R head is 0.5 DTP with a 0.6 DTP-wide magnetization. The curves are labelled with A, B, C, and D corresponding to the respective servo pattern bursts. The vertical scale represents relative magnitude of the readback signal and is shown in arbitrary units. Each of the curves A, B, C, and D is identical, except for a one-half track offset between the curves.

Figure 8:
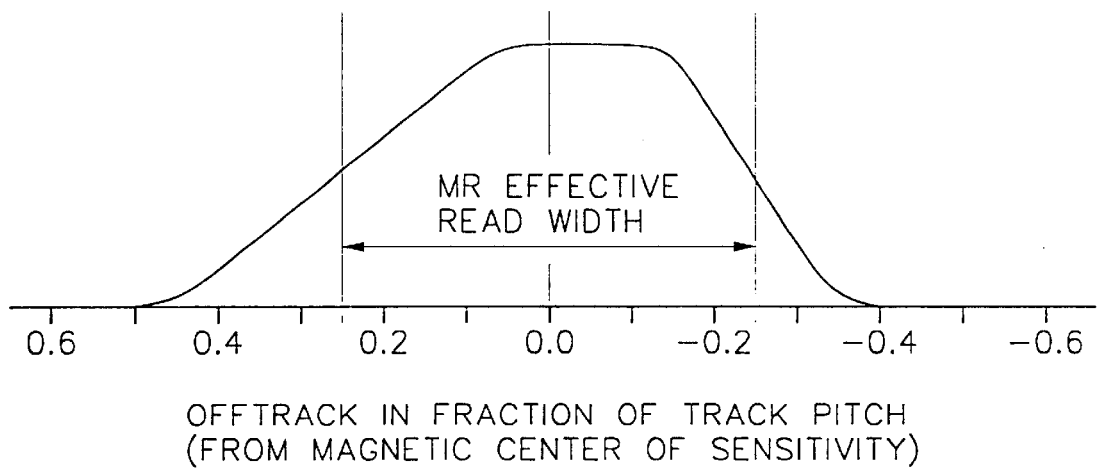
FIG. 8 is a graph of magneto-resistive (M-R) head sensitivity showing the head sensitivity as a function of cross-track position.
Figure 9:
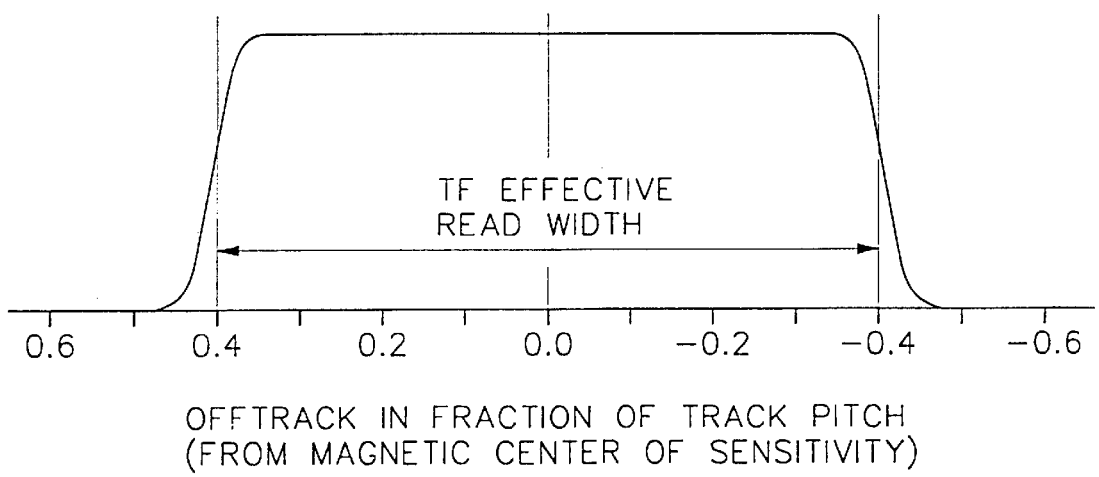
FIG. 9 is a graph of thin-film (TF) head sensitivity showing the head sensitivity as a function of cross-track position.

FIG. 8 is a graph of head sensitivity for a typical magneto-resistive (M-R) head showing the head sensitivity as a function of cross-track position. FIG. 9 is a graph of head sensitivity for a typical thin-film (TF) head sensitivity showing the head sensitivity as a function of cross-track position.

As shown in FIG. 8, the M-R head sensitivity is not symmetric with respect to head width as 2 function of track offset, having a longer "tail" on one side of the head. Thus, the displacement curves of FIG. 7 have a slightly longer tail on one side (the right side) than the other, caused by the asymmetry of the cross-track sensitivity.

Figure 10:
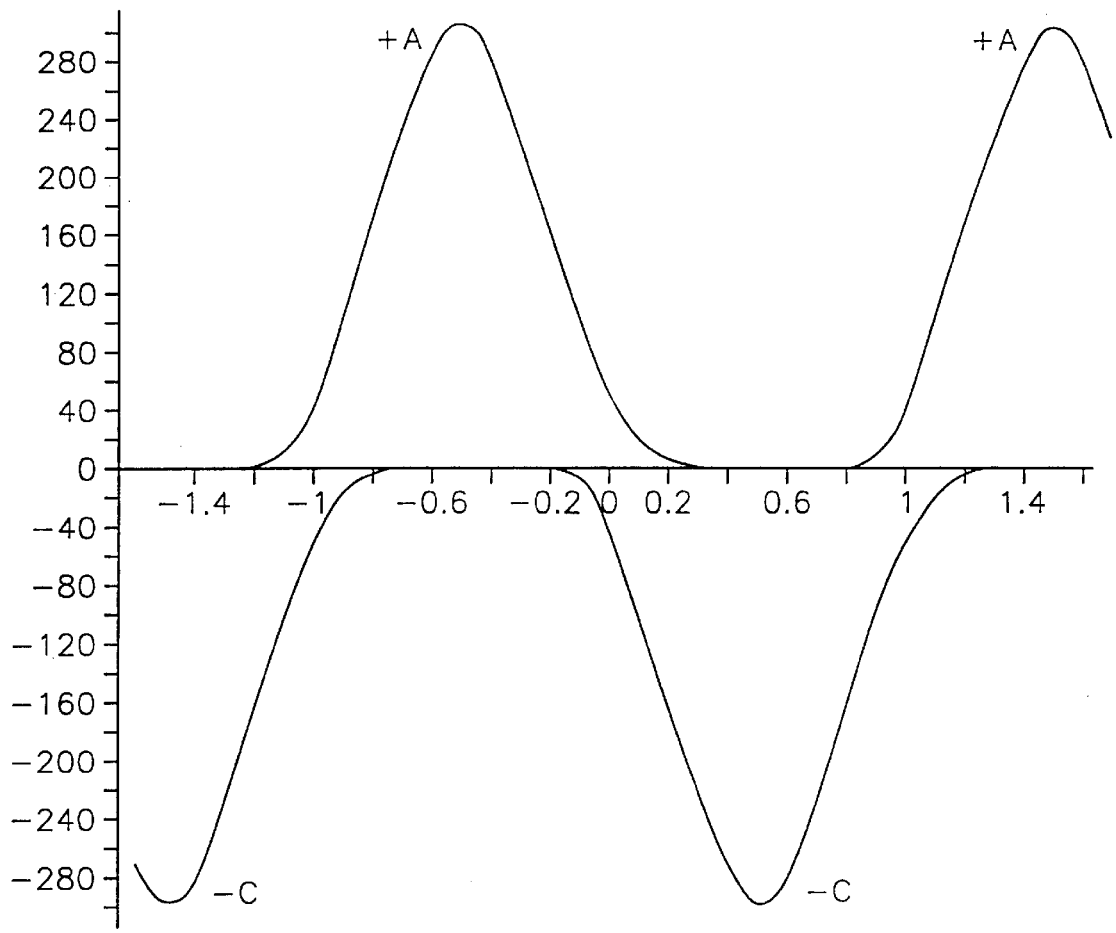
FIG. 10 is a displacement graph of the A and C curves from FIG. 7 in greater detail, showing the A curve with positive polarity and the C curve with negative polarity.

FIG. 10 shows the A displacement curve from FIG. 7, and also shows the beginning of a second A curve at the right side of the drawing. It should be understood that the second a curve is generated from an A servo pattern burst two tracks beyond the burst used to generate the first A curve. FIG. 10 also shows the C curve from FIG. 7, plotted with a negative polarity. On the left side of the drawing is the beginning of a second -C curve. It should be understood that the second -C curve is generated from a C servo pattern burst two tracks beyond the burst used to generate the first -C curve.

Figure 11:
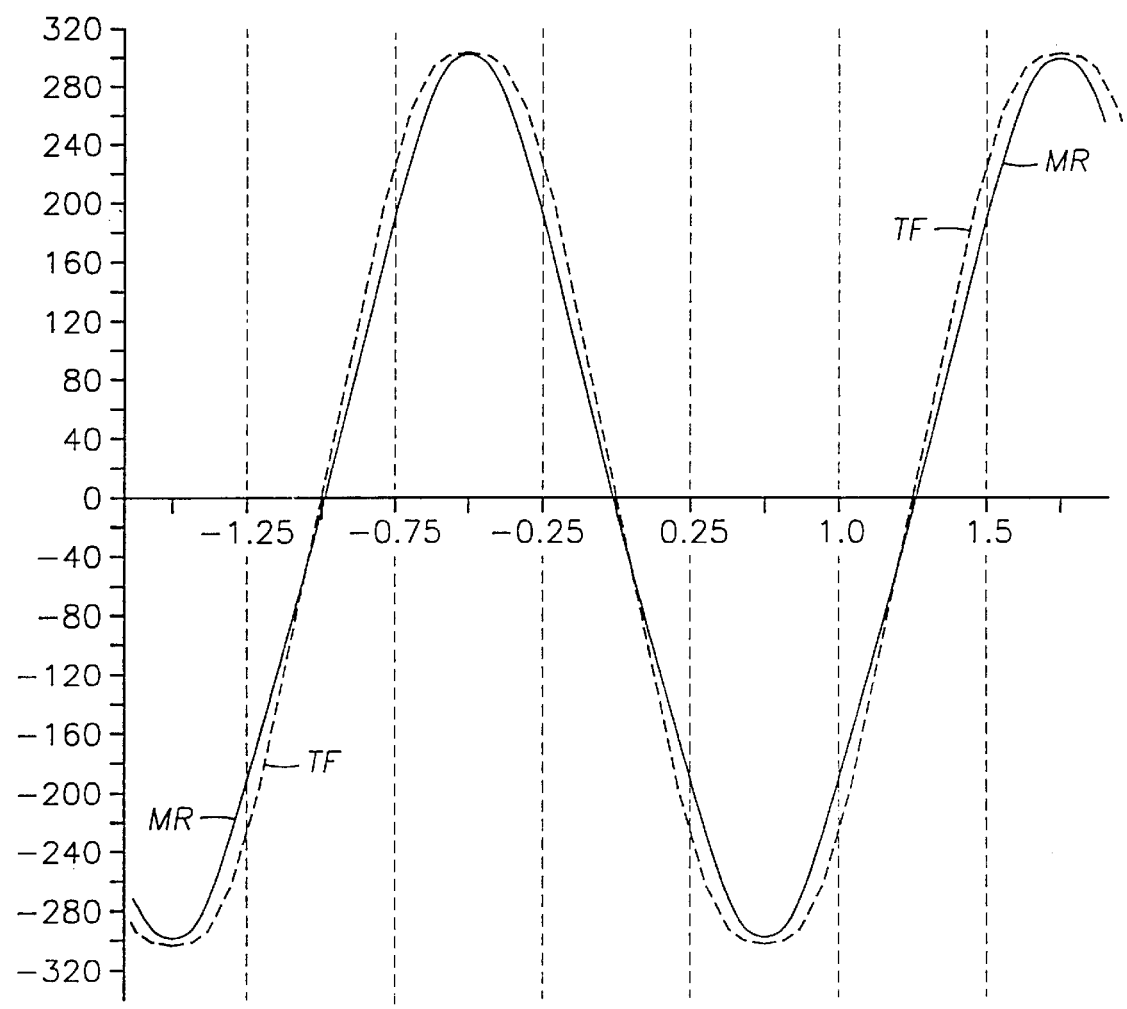
FIG. 11 is a representation of the A–C curve from which the PES signal is generated, obtained from combining the A and -C curves from FIG. 10 for the M-R head results and corresponding curves for a thin-film head, for the thin-film head curve.

FIG. 11 shows the A–C function, obtained from combining the A and -C curves illustrated in FIG. 10, in solid line. It should be apparent that, for much of the A curve, there is no amplitude from either of the -C curves. Thus, in these areas essentially all of the A–C function is generated by the amplitude from the A curve, near the upper half of the curve. Similarly, for the -C curve, the two A curves only affect the A–C function on the edges of the -C curve. At the central part of the -C curve, there is no amplitude from the A curve.

The A–C function makes up the primary servo function, and the quasi-linear functions in regions around integer track positions are used for the position error sensing (PES) signal. This signal is not useful in the other regions where the peaks occur. Thus, the B–D function (not shown) is used to provide a quasi-linear region around the half-track positions. By switching between the A–C function and the B–D function, a quasi-linear PES function can be provided for all off-track locations.

From FIG. 10, it can be seen that in the regions around integer track positions (track zero, track +1, track −1, etc.) the amplitudes of the two curves affect the sum function, causing the total function curve of FIG. 11 to be straightened in these regions. That is, the FIG. 11 function will be more linear in these regions. Nevertheless, the slope of the function in these regions will not necessarily be the same slope as in the upper part of the curves. Thus, the A–C curve is steeper around the zero track region than away from the zero track region.

In general, the narrower the individual readback magnitudes in the radial direction are, the lower will be the slope of the A–C function around the zero track region, and the higher the slope in the region between the zero and the peak. Such differences are corrected by simple digital correction techniques known to those skilled in the art, which are more commonly being used in M-R head disk drive systems.

FIG. 11 also shows, in dashed line, the raw position error signal (PES) for a typical thin-film (TF) head for A–C bursts. That is, FIG. 11 shows a comparison between the raw PES derived from A–C for the case of the maximum achievable single pass burst width for a frequency within the data band, using the M-R read element (the solid line), with that obtained with a PES from a typical thin-film read head (the dashed line), for the respective sensitivity curves shown in FIG. 8 and FIG. 9.

The thin-film (TF) head with a width of 0.8 DTP provides the better results for the region of ±0.2 DTP from the track zero crossing position. The TF head provides a near-perfect zero crossing position and good linearity over this range. In this region the M-R head produces an offset in amplitude at the track zero position and also produces some mild curvature, producing some non-linearity. It should be noted that an M-R head is non-symmetric in its cross-track sensitivity (causing the zero offset), and most of its sensitive region is tapered with very little "flat" sensitivity, which causes the curved PES shapes. However, an M-R head produces much more signal than a TF head. Since the M-R head allows much more capacity to be recorded than a TF head, then the servo design must find the best solution to use the M-R head, even with the imperfections.

Next, consider a comparison for offtrack distance of more than ±0.2 DTP. To maintain the standard lower number of servo write passes to reduce production cost, the A–C curve must be valid and usable for ±0.25 DTP from the true zeroes. This includes every other region denoted by vertical dashed bars in FIG. 11 for the solid line curve (M-R head) and the dashed line curve (TF head). The B–D curves (not shown) cover the other regions. Digital logic must switch between these regions to use the appropriate curve for each servo position calculation. Due to imperfections and noise, one specific region may be sometimes used somewhat past the boundary, and therefore the curve should be fairly accurate and linear for ±0.3 DTP.

With the maximum single pass high frequency servo burst of about 0.6 DTP and a typical TF head width of 0.8 DTP, the one edge of the TF head runs off the edge of one of the bursts (A or C) when the head is offset by 0.2 DTP. For higher offtrack positions, the PES only changes half as fast, since only one of the bursts is changing the amount of single that contributes to A–C. Therefore, there is a relatively abrupt change in slope to ½ the previous value. Note that the slope is directly related to the servo gain. Having a variation in gain reduces the servo system correcting power and reduces the bandwidth that can be used.

For the M-R head PES from FIG. 11, it can be seen that there is significantly less change in slope over the ±0.3 DTP region compared with the TF head. For the processing used in the present invention, where the M-R sensitivity is purposely used from the variable sensitivity region, the non-linearity has a smooth shape with no abrupt changes. This makes the use of correction signals much more accurate in comparison to attempting to linearize the TF PES signal.

In actual product storage units, there is usually a tolerance on the width of elements greater than ±0.1 DTP. Thus, the location of a "break" in a curve, such as that which occurs with the TF heads, is not known very accurately. Thus, if a digital (or analog) correction is applied with some error, there may be two abrupt changes in slope offset by about 0.1 DTP. Due to the relatively sharp edges in the TF head sensitivity, these changes in gain (slope) can be significant. If the slope correction is offset in one direction, the slope may be corrected steeper before the actual change in slope is reached, producing a significantly higher gain in the servo, which can cause an oscillation around this point.

With the M-R PES as described herein, the change in slope is very gradual, and an error in a correction curve that is offset by 0.1 DTP will have a very small error, and minimal change in servo gain. Thus, the disclosed use of the PES over an extended range with an M-R head can actually give superior linearity with moderate corrections than can be achieved with TF heads.

Note that conventional servo PES design has been to use the signal only when the edge of the magnetization was crossing a uniform sensitivity portion of the read head. This was quite logical when the uniform sensitivity region was broad, as in TF heads and other inductive heads. However, as M-R heads have very small regions of uniform sensitivity (due to their internal design), the above process begins to not be so logical, as more smaller bands were required to always have a pattern so some edges were always crossing the uniform regions. Specifically, the slanted sensitivity regions of the M-R head were totally avoided in the conventional design.

The invention described herein makes use principally of the variable sensitivity regions to produce broad useful widths with only slowly varying non-uniformities that are relatively easily corrected, while maintaining the high signal content of the M-R element and the lower number of written servo patterns to cover the full useful radial band of the disks.

Linearity and Normalization

It was noted from FIG. 11 that in the region near the zero track, the readback function curve was not linear. While the non-linearity within ±0.25 DTP from the zero track in FIG. 11 is evident, it is not so large that linearizing improvements are accurately illustrated. To better see the linearizing process, the amplitude is tabulated every 0.05 DTP in FIG. 12, over the range of ±0.25 DTP.

The first column (1) in the table of FIG. 12 is the original raw A–C curve, between –0.25 DTP to +0.25 DTP, the region where A–C should be fairly linear. Note that the amplitude changes from +192 to –192, so the ends are of equal magnitude. However, the amplitude is 14 units at the zero position, when it should be a zero value. This shows that there is a second-order error in the overall curve. This is caused by the non-symmetric cross-track sensitivity of the M-R read element.

A first method to linearize this curve is to first normalize the waveform with an automatic gain control (AGC), to be described further below, and then to directly apply a digital correction. The simplest way to visualize the correction is to use a look-up table, in which the input signal units would correspond to a table index address, and the data in the table would be the offtrack distance. For example, there could be 512 table addresses that could represent signal numbers from –256 to +255, containing signed binary data from –256 to +255. For an A–C value of +192, the data at table address 192 would be –250, which would represent thousandths of data track pitch (DTP) or –0.250. For an address of +14, the data would be 0.

A more practical solution may be to use multiple piecewise linear sections to transfer units of A–C to offtrack distance. For example, there might be ten linear regions, each corresponding to 0.05 DTP as listed in FIG. 12. The top region would translate the A–C numbers from +192 to +160 into –0.25 DTP to –0.20 DTP in a linear section using slope and intercept data. Ten comparisons would be required to determine the correct region and ten sets of slope and intercept data.

The tabular data in columns (2) through (9) in FIG. 12 relate to another method used according to the present invention. Such method includes a self compensation scheme for the second-order error using the correction function:

$$A-B+C-D.$$

Other columns relate to an AGC method and residual error from linearity. The correction function A–B+C–D creates a near-sinusoidal shaped curve with a period of one data track pitch (DTP), which is half the period of the A–C function (or B–D function). The correction function has a positive peak value when the head is centered on the A burst, a negative peak when the head is centered on the B burst, a positive peak again when centered on the C burst, and a negative peak again when centered on the D burst. Thus, the amplitude of the correction function is zero on the edges of the PES curve near the zero track offtrack position, with a negative peak at the zero offtrack position. This can be seen in the second column of Table 1, shown in FIG. 12.

The derivation of the correction function can be illustrated as follows. A correction value is generated using the A–B+C–D function by noting that, for the zero track position, the amplitude of the A–C curve is fourteen units while the value of the correction function is –212. The value of the correction function at the zero track position can be adjusted in magnitude so as to cause the sum of the A–C curve and the adjusted correction function to be zero at track zero. This is illustrated by column (3) of Table 1, which shows that the adjustment in this case is to divide the correction function by fifteen. The fourth column in Table 1 is the sum of the first and third columns, showing that the sum at the zero track is zero. The values of the adjusted correction function and sum in column (4) are more linear than the values in column (1).

The fifth column of Table 1 in FIG. 12 shows a function, generated from the readback signal values, defined by:

$$A+B+C+D.$$

If all bursts were exactly 0.5 DTP in width, then the magnitude of the function A+B+C+D would be constant for any offset and any head sensitivity shape. However, the assumed magnetization width is 0.6 DTP and the sum is not perfectly constant, and the deviation depends on the shape of the head sensitivity. In this case, the shape of the M-R sensitivity curve can be said to be "smoother" than that of a TF head and causes less variation in the A+B+C+D function with different values of the burst widths. Given the assumption of 0.6 DTP, this function has an average value of 384 units. Column (6) of Table 1 shows the relative gain variation when the AGC circuit forces a constant output, for example 384 units, the change in gain that is equal to the sum (column 5) divided by the constant output, assumed to be 384 for simplicity. Column (6) shorts the maximum gain error is only 3.23% for this example. Column (7) of Table 1 shows the affect of the gain change and indicates that gain error actually reduces the maximum error from linearity of the PES signal.

To demonstrate the linearity obtained with the processing of the preferred embodiment, column (8) of Table 1 shows a straight linear projection; rounded to the nearest integer, for the range of the actual PES curve, column (1) of Table 1, and column (9) of Table 1 shows the correction value that must be added to the actual PES curve values of column (1) to bring the actual values into line with the straight linear values. It should be noted that the maximum correction value occurs at the track position Track N+0.15, with a value of ten units. Thus, over the 0.50 track width represented in Table 1, the maximum variation is ten units over a range of +192 to –192 units, a 2.6% error variation, or 0.013 DTP error. Thus, the small addition of the fraction of the A–B+C–D function reduces the maximum deviation two times lower than without this function.

It should be appreciated that the relatively small theoretical error demonstrated for the system of the present invention indicates that many disk drive systems constructed in accordance with the present invention may not require any digital correction of the PES signal to obtain satisfactory performance. Even if digital correction is used, the values of Table 1 show that the correction values should be relatively small, thereby reducing the complexity of the correction scheme needed. For example, rather than the ten correction regions (five on each side of track center) as represented by Table 1, previously described above in the basic method, it may be adequate to provide a reduced number of correction regions. For example, it may be necessary to provide only four correction regions (two on each side).

Gain Calibration for Two Frequencies

Any disk drive system that includes digital demodulation circuitry will typically include automatic gain calibration (AGC) circuitry to regulate the value of the readback signal. One method was previously described using the A+B+C+D method. In the preferred two-frequency embodiment in accordance with the present invention, there will be some difference in the read amplitude of the two frequencies. which will be somewhat different for each head design, and for different track radii. Therefore, relative gain calibration between the two frequencies must be provided for each head and multiple radii. The preferred embodiment accomplishes this by following a procedure in which the AGC circuitry is permitted to calibrate the readback signal with the head positioned at one of the tracks, using the A–C PES signal, thereby reading only one of the servo burst pattern frequencies of the quadrature bursts (the B burst) and, holding the gain, then moving the read head over to an adjacent track, reading the other servo burst frequency in the D burst, whereupon a relative gain circuit is adjusted to make the two signal values equal. If the signals are analog in form, a multiplying DAC can be used to digitally adjust the magnitude of the analog waveform. If the signal design is digital, then a digital multiplier can be used to adjust the digital magnitude.

Figure 13:
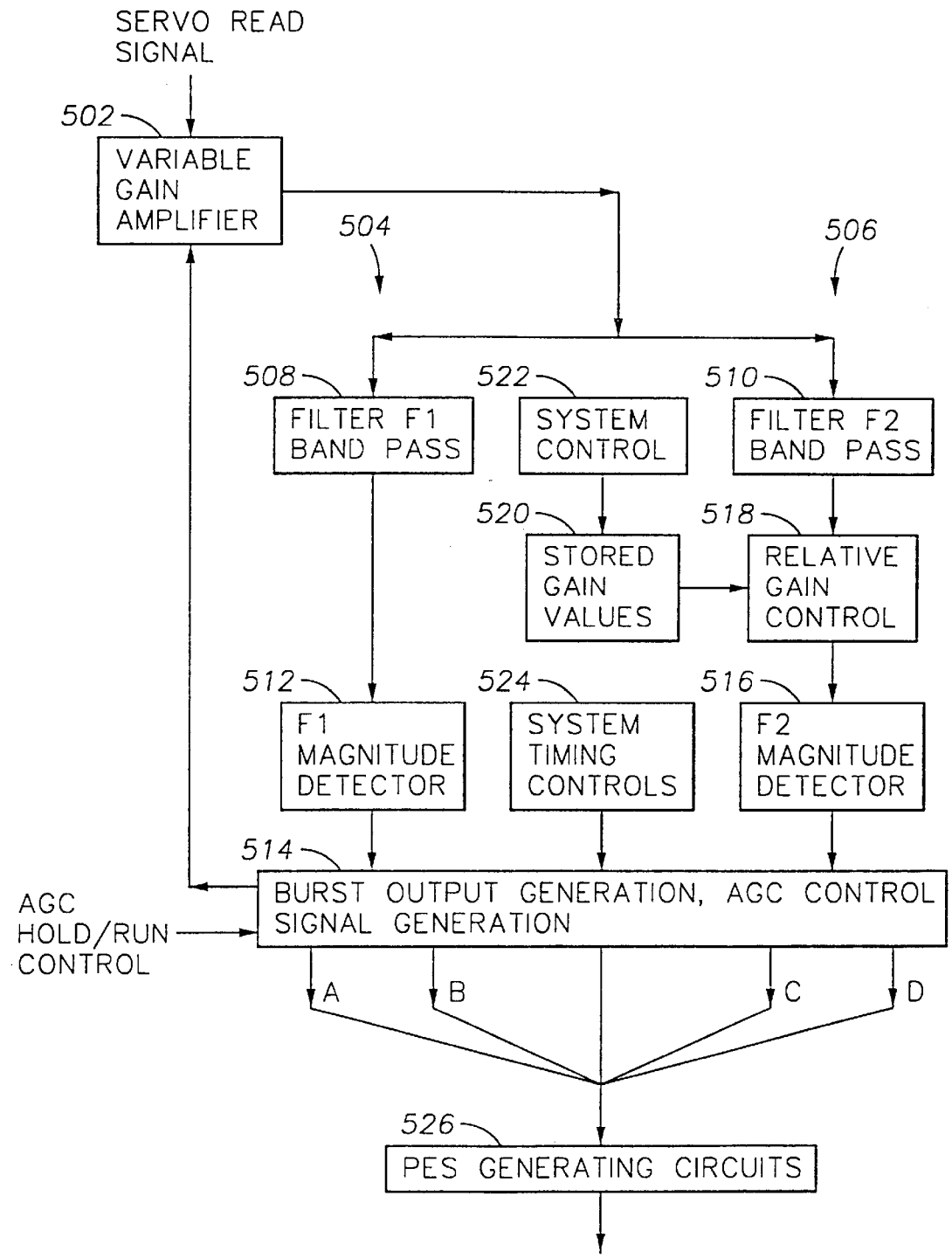
FIG. 13 is a block diagram that represents circuitry to perform two-frequency gain calibration.
Figure 14:
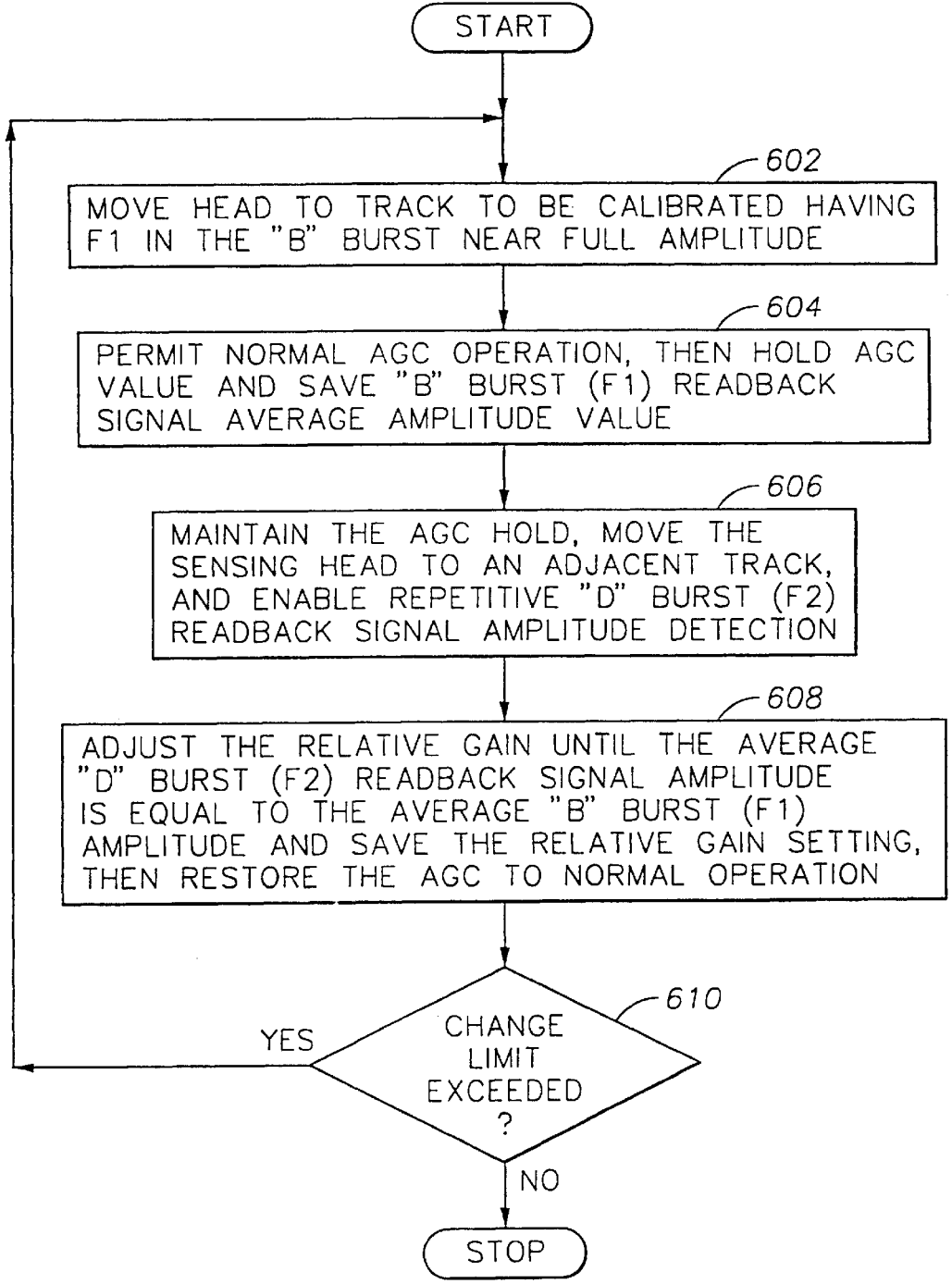
FIG. 14 is a flow diagram that represents the steps performed in adjusting the gain between the two servo pattern burst frequencies illustrated in FIG. 5.

FIG. 13 is a block diagram that represents servo signal processing circuitry to perform two-frequency gain calibration. FIG. 14 is a flow diagram that illustrates the process of gain calibration.

In FIG. 13, the servo readback signal is received in a variable gain amplifier 502. The readback signal is provided to a first frequency (F1) processing channel 504 and to a second frequency (F2) processing channel 506. Each channel includes a bandpass circuit, an F1 bandpass circuit 508 and an F2 bandpass circuit 510. A first frequency F1 magnitude detector 512 provides the maximum amplitude F1 signal to a burst output and AGC control signal generator 514, and a second frequency F2 magnitude detector 516 provides the maximum amplitude F2 signal to the generator after processing by a relative gain control circuit 518. The relative gain control circuit 518 uses stored gain values 520 provided by a system control 522, the operation of which is described below in conjunction with FIG. 14.

The processing of the first and second frequency data in the signal generator 514 is controlled by system timing controls 524. The system timing controls block creates timing windows around each burst in which to find the magnitude of the signal. In the first timing window, the F1 and F2 signals provide the A and C magnitudes, respectively. In the second timing window, the F1 and F2 signals provide the B and D magnitudes, respectively. The burst output and AGC control signal generator 514 produces the A, B, C, and D servo pattern burst data and provides it to PES generating circuitry 526, which is often referred to collectively as the servo demodulator.

FIG. 14 illustrates the operation of the servo signal processing system of FIG. 13. In FIG. 14, the flow diagram box numbered 602 indicates that the read head is moved to a position over a first track to be calibrated, having a servo signal at or near a full amplitude value. This track position in the FIG. 5 illustration might be, for example, Track N. It should be clear that, in this position, the read head will be generating a readback signal comprised of only the "B" servo burst pattern, in the quadrature section (right side), which has the first frequency (F1) of the servo burst pattern. Note that the primary bursts (A and C bursts) in the primary (left side) are providing the servo tracking information at this position.

The next step, represented by the FIG. 14 flow diagram box 604, is to let the AGC circuitry adjust the readback signal gain, and then hold that setting, saving the B average amplitude. Next, as shown in the flow diagram box numbered 606, the AGC setting is held and the read head is moved to an adjacent track, and the signal from the other frequency (F2) is repetitively read. In the FIG. 5 illustration, this adjacent track might be, for example, Track N+1. It should be clear that, in this position, the read head will be generating a readback signal comprised of only the "D" servo burst pattern in the quadrature (right) part of the pattern.

At this point, the FIG. 14 flow diagram box numbered 608 indicates that the readback signal is received and the relative gain of the signals from the two frequencies is adjusted to make the average signal magnitudes equal. That is, gain adjustment is performed until the average "D" burst value is equal to the average "B" burst value. This relative gain setting is saved in a settable gain control circuit and then the AGC circuit operation is restored to its initial operation settings. The next step, represented by the decision box numbered 610, is to check for a relative gain change that exceeds a predetermined error limit value. If the limit value is exceeded by the amount of gain adjustment needed for equality, then the process is repeated to let the AGC circuitry once again "set up" on the first frequency and then the second frequency. If the limit value was not exceeded, then the gain adjustment completes the calibration processing. Note that if the gain originally was incorrect, the servoing on the A–C bursts will not produce quite the correct positioning, so the correction of the relative gain may not be perfect. With a first relative gain correction, the servo accuracy is improved, making the second gain calibration even more accurate.

It should be apparent that the flow diagram steps of FIG. 14 could just as well be performed on the servo pattern bursts located at the earlier time (primary set), therefore using first the A and then the C servo pattern bursts. In this case, the B–D signal would be used for the servo, and the head would be centered between data tracks, such as the N–0.5 track position, and the N+0.5 track position shown in FIG. 5. That is, the read/write head would be positioned to read the A servo pattern bursts, analogous to the flow diagram box numbered 602, and the gain would be adjusted (box 604). Next, the head would be moved to read the C servo pattern bursts, analogous to the flow diagram box numbered 606. Similarly, the gain would be compared and adjusted (box 608) and then a test for the change limit would be made (box 610).

Three-Frequency Servo Pattern

Figure 15:
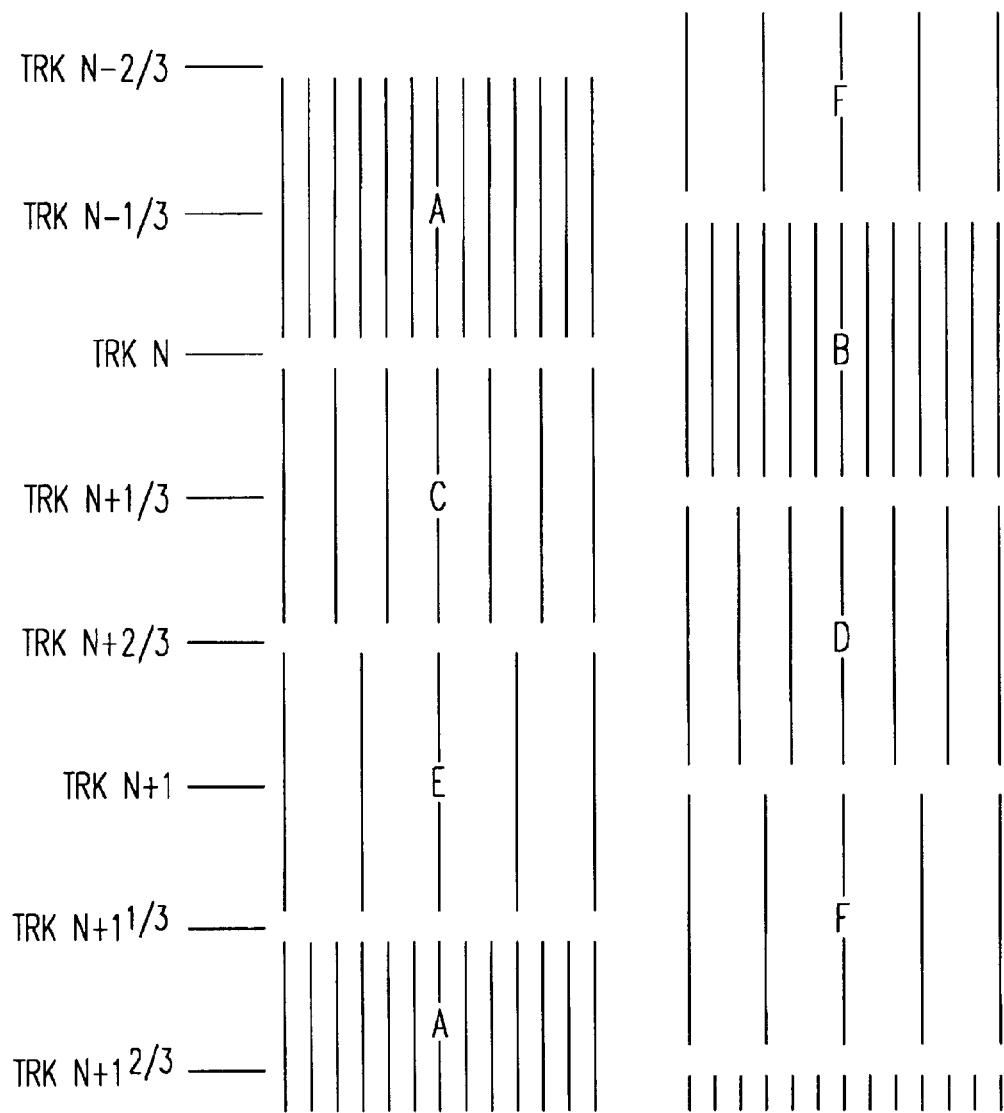
FIG. 15 is a representation of a three-frequency servo pattern in accordance with the present invention.

The invention may be implemented in more than the two frequencies described thus far. For example, FIG. 15 shows a three-frequency servo pattern having servo pattern bursts A. B, C, D, E, and F. The servo pattern bursts A, C, and E are radially aligned in the radial direction (though displaced from each other), and the servo pattern bursts B, D, and F are radially aligned and circumferentially displaced from the A, C, and E bursts. It should be apparent that the centerline of the B servo pattern burst is displaced one-third of a data track pitch (DTP) from the centerline of the A servo pattern burst. This spacing is repeated for the following servo pattern bursts, and therefore the centerline of the C servo pattern burst is displaced one-third DTP from the centerline of the B servo pattern burst, the centerline of the D burst is displaced one-third DTP from the centerline of the C burst, the centerline of the E burst is displaced one-third DTP from the centerline of the D burst, and the centerline of the F burst is displaced one-third DTP from the centerline of the E burst.

With respect to the different frequencies, the A bursts and the B bursts are of the same frequency, the C and D bursts are of another frequency, and the E and F bursts are of a third frequency, different from the first and second. Using multiple frequencies in this manner permits a more compact servo pattern, because the servo pattern bursts do not have to be distinguished from each other in time (space on the disk); rather, they can easily be distinguished with appropriate demodulation discrimination circuitry.

Gain calibration for the three frequency embodiment can be performed similarly as the dual-frequency embodiment. That is, the first frequency is read, the second frequency is read and the gain is adjusted to equalize the readback signal magnitude, the gain adjustment is compared to a change limit value, then the third frequency is read and the gain is adjusted, with a last comparison to a change limit value for the gain adjustment.

It should be noted that the distance between the transitions in FIG. 15 are for illustration only. Actual selections of frequencies would be closer together than illustrated, with actual spacings selected so as to optimize the detected results within reasonable cost and complexity for the design parameters.

Recording the Servo Pattern

The simplified servo writing process described above is achieved by using the detection process that makes use of the non-uniform sensitivity areas of an M-R head as described herein. This provides a compact servo pattern that, as described above, is very robust. The servo writing steps are illustrated in flow diagram representation by FIG. 16. The steps begin with moving the head to the starting track position, represented by the flow diagram box numbered 701. This starting track will normally be at or near either the inner or outer crash-stop position (physical limit) of the actuator. The choice conventionally is made on criteria for each disk drive manufacturer, and the choice does not affect the basic process described herein.

Figure 16:
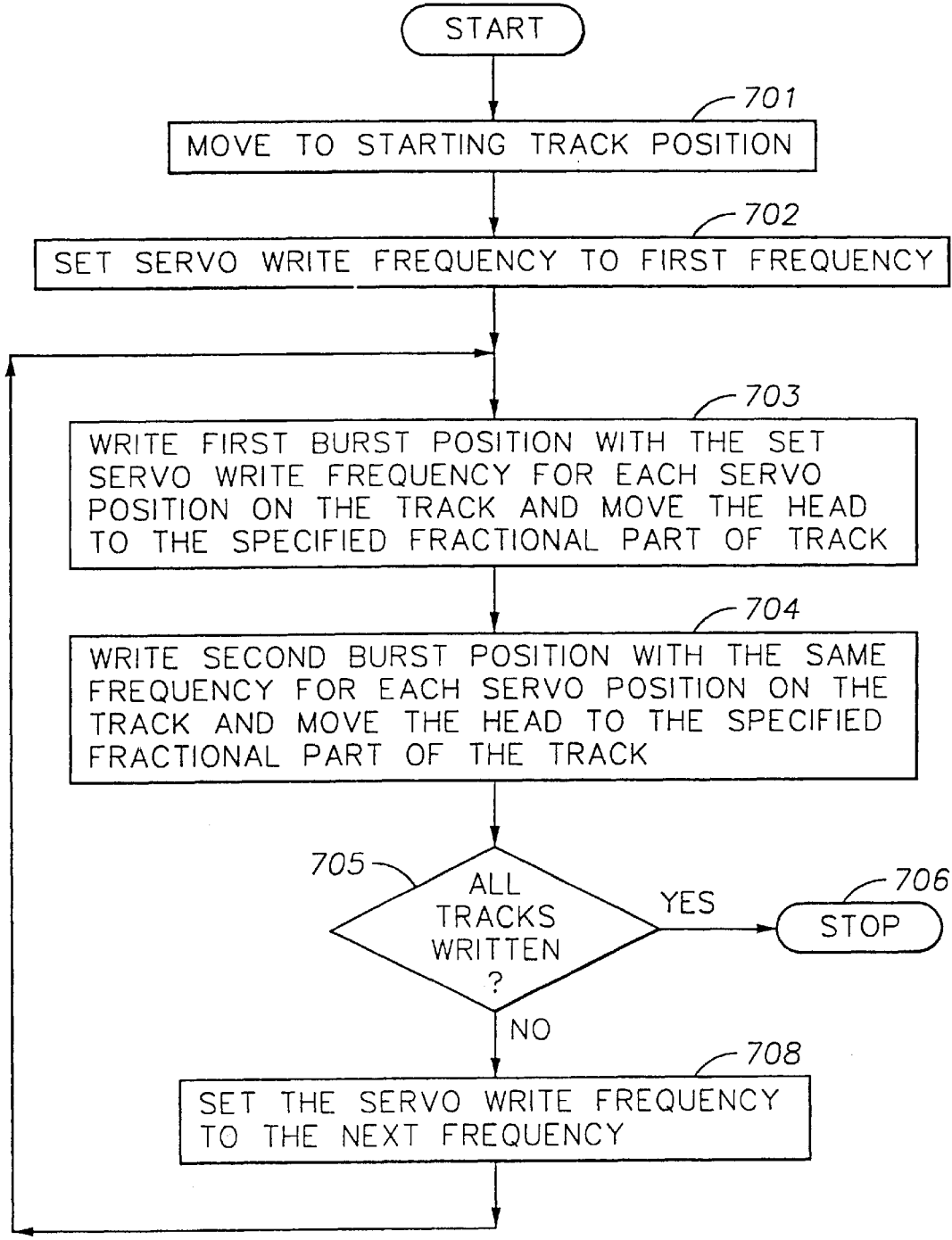
FIG. 16 is a flow diagram that represents the steps performed in recording the servo pattern illustrated in FIG. 4 and FIG. 5 onto a disk surface.

After the head is moved to the start position, the first frequency is loaded, as represented at the FIG. 16 flow diagram box numbered 702. The burst is written in the first burst position, which is the left side in FIG. 5 or FIG. 15, using the frequency selected. Note that the servo pattern transitions at all the other first burst positions on the same track also will be written on one revolution of the disk. As most disk drives have multiple heads on one actuator, all the other heads may also write their corresponding first burst positions with the selected frequency. With some electronics write modules, multiple heads may be writing simultaneously to minimize the number of revolutions needed for writing. In some cases, multiple surfaces may be written in the same revolution by interleaving writes on different disk surfaces, which can be done because the servo information occupies such a small part of the distance between servo sectors.

When the first position bursts are written, the actuator moves the head a specified portion of a data track pitch. The writing and moving is illustrated by the box numbered 703. Note that moving in the servo-writing process is usually accomplished by accurately controlled direct mechanical pushing, or the actuator being under a laser feedback control. If the pattern in FIG. 5 is being written, the A burst would have been written with the first frequency and the head would have been moved one-half DTP. If the pattern in FIG. 15 is being written, the A burst would also have been written with the first frequency, but the head would have been moved one-third DTP. For other possible patterns, the move may be some other percentage of the DTP. In some cases, the DTP may also be varied somewhat across the radial band, to take advantage of various effects that allow some increase in the total tracks to be written.

After the completion of the head move step, the second servo burst position is also recorded at the selected frequency, which corresponds to burst B in FIG. 5 and in FIG. 15. The head is then moved by the specified fraction of the DTP. The writing of this burst and moving is represented by the flow diagram box numbered 704 in FIG. 16. The servowriter next checks to determine if all tracks have been written, as indicated by the decision box numbered 705. Because it is not complete, the servowriter loads the next frequency, as illustrated by box 708. The servowriter proceeds to write the first burst position with the specified frequency, which is now the second frequency. The head is then moved again. This completes the write of burst C and the move. Note that this burst C is also illustrated by box 703, which also illustrates the writing of burst A on the previous time through the loop. Then the D burst is also written with the second frequency, as illustrated by box 704 just as for the B burst writing.

Now when the servowriter selects the next frequency, and if the pattern from FIG. 5 is being written, then the next frequency is the first frequency. Thus, with two specified frequencies, the frequency is switched after each pass through the loop illustrated by FIG. 16. If the pattern from FIG. 15 is being written, then the next frequency after the second frequency is the third frequency. As the FIG. 16 processing loop is executed, burst E and burst F are written with the third frequency. In the following pass, the next frequency after the third frequency is the first frequency. The cycling continues, in either case, until the total number of tracks is written. The decision block 705 in this case finds all the tracks written and stops the process, as illustrated at the ending stop, box 706.

When the servo write process is completed, the gain calibration steps described above can take place. Thus, the read head would be positioned in first one track to read the first frequency bursts, and then the head would be moved to the next adjacent track to read the second frequency bursts, as described above. This processing would be performed as described in FIG. 14 and would take place following the completion of the servo writing at box 706. The calibration would be done for several radii and for all heads, and the calibration values would be stored.

Advantages of the Invention

Thus, a preferred embodiment of a disk drive system has been described, in which a magneto-resistive (M-R) read/write head transduces a servo pattern having servo pattern bursts it has written without taking multiple passes per burst and without trimming, so the servo pattern bursts have the same width as the data tracks. Gain calibration in a two-frequency pattern is accomplished with a simple procedure that gain adjusts the first frequency and then adjusts a relative gain upon reading the second frequency. In this way, the servo pattern is easier to write than conventional patterns, and the resulting servo position error sensing (PES) signal has improved linearity due to using the unique methods with M-R heads.

The present invention has been described above in terms of presently preferred embodiments so that an understanding of the present invention can be conveyed. There are, however, many configurations for disk storage systems and servo control systems not specifically described herein but with which the present invention is applicable. The present invention should therefore not be seen as limited to the particular embodiments described herein, but rather, it should be understood that the present invention has wide applicability with respect to disk storage systems and servo control systems generally. All modifications, variations, or equivalent arrangements that are within the scope of the attached claims should therefore be considered to be within the scope of the invention.

I claim:

1. A magnetic disk for a direct access storage device, the magnetic disk having a servo pattern recorded on a surface thereof for positioning a transducer head relative to data tracks of the magnetic disk, the servo pattern comprising:
   a first set of servo bursts that extend generally radially across the surface of the magnetic disk, each servo burst in the first set having a width equal to that of data recorded in the data tracks and spaced apart radially from other servo bursts in the first set, the first set of servo bursts including a repeating sequence of bursts comprising transitions recorded at respective first, second, and third frequencies; and
   a second set of servo bursts extending generally radially across the surface of the magnetic disk angularly offset from the first set of servo bursts, each servo burst in the second set having a width equal to that of data recorded in the data tracks and spaced apart radially from other servo bursts in the second set, the second set of servo bursts including a repeating sequence of bursts comprising transitions recorded at the respective first, second, and third frequencies, the servo bursts of the first and second sets of equal frequency offset from one another by a predefined fraction of the data track pitch, wherein the predefined fraction is one-third of the data track pitch.

2. The magnetic disk of claim 1, wherein at least one servo burst from the first set of servo bursts has a centerline that is in-line with a centerline of a data track.

3. The magnetic disk of claim 2, wherein a servo burst of the second set of servo bursts having a frequency equal to that of the at least one servo burst from the first set has a centerline that is offset from the centerline of a data track by one-third of the data track pitch.

4. The magnetic disk of claim 1, wherein at least one servo burst from the second set of servo bursts has a centerline that is in-line with a centerline of a data track.

5. The magnetic disk of claim 4, wherein a servo burst of the first set of servo bursts having a frequency equal to that of the at least one servo burst from the second set has a centerline that is offset from the centerline of a data track by one-third of the data track pitch.

6. The magnetic disk of claim 1, wherein:
   at least one servo burst from the first set of servo bursts has a centerline that is in-line with a centerline of a data track; and
   at least one servo burst from the second set of servo bursts has a centerline that is in-line with a centerline of a data track.

7. A magnetic disk for a direct access storage device, the magnetic disk having a servo pattern recorded on a surface thereof for positioning a transducer head relative to data tracks of the magnetic disk, the servo pattern comprising:
   a first set of servo bursts that extend generally radially across the surface of the magnetic disk, each servo burst in the first set having a width equal to that of data recorded in the data tracks and spaced apart radially from other servo bursts in the first set, each servo burst of the first set of servo bursts comprising transitions recorded at a frequency differing from a frequency of an adjacent servo burst of the first set; and
   a second set of servo bursts extending generally radially across the surface of the magnetic disk angularly offset from the first set of servo bursts, each servo burst in the second set having a width equal to that of data recorded in the data tracks, each servo burst of the second set of servo bursts spaced apart radially from other servo bursts in the second set, each servo burst of the second set of servo bursts comprising transitions recorded at a frequency differing from a frequency of an adjacent servo burst of the second set, the servo bursts of the first and second sets of equal frequency offset from one another by a predefined fraction of the data track pitch, wherein the predefined fraction of the data track pitch is one-third of the data track pitch.

8. The magnetic disk of claim 7, wherein the first set of servo bursts comprises at least one servo burst having transitions recorded at a first frequency and a centerline that is in-line with a centerline of a data track.

9. The magnetic disk of claim 7, wherein the second set of servo bursts comprises at least one servo burst having transitions recorded at a second frequency and a centerline that is in-line with a centerline of a data track.

10. The magnetic disk of claim 7, wherein the first set of servo bursts comprises a first servo burst having transitions recorded at a first frequency and the second set of servo bursts comprises a second servo burst having transitions recorded at the first frequency, the first servo burst having a centerline that is in-line with a centerline of a data track, and the second servo burst having a centerline that is offset from the centerline of the data track by one-third of the data track pitch.

11. The magnetic disk of claim 7, wherein the first set of servo bursts comprises a first servo burst having transitions recorded at a first frequency and the second set of servo bursts comprises a second servo burst having transitions recorded at the first frequency, the second servo burst having a centerline that is in-line with a centerline of a data track, and the first servo burst having a centerline that is offset from the centerline of the data track by one-third of the data track pitch.

12. A disk drive, comprising:
   (a) a magnetic storage media disk with a magnetic recording material deposited on a surface of the disk and on which is recorded servo pattern bursts comprising a sequence of magnetic transitions defining a servo pattern having:
      (1) a first set of servo bursts that extend generally radially across the surface of the magnetic disk, each servo burst in the first set having a width equal to that of data recorded in the data tracks and spaced apart radially from other servo bursts in the first set, each servo burst of the first set of servo bursts comprising transitions recorded at a frequency differing from a frequency of an adjacent servo burst of the first set; and
      (2) a second set of servo bursts extending generally radially across the surface of the magnetic disk angularly offset from the first set of servo bursts, each servo burst in the second set having a width equal to that of data recorded in the data tracks, each servo burst of the second set of servo bursts spaced apart radially from other servo bursts in the second set, each servo burst of the second set of servo bursts comprising transitions recorded at a frequency differing from a frequency of an adjacent servo burst of the second set, the servo bursts of the first and second sets of equal frequency offset from one another by one-third of the data track pitch;
   (b) a sensing head that transduces the servo data and produces a servo signal;
   (c) a servo demodulator that receives the servo signal, recognizes the servo burst pattern data, and produces a position error sensing (PES) signal; and (d) a servo that moves the sensing head relative to the surface of the magnetic storage media disk in response to the PES signal.

13. The disk drive of claim 12, wherein the first set of servo bursts comprises at least one servo burst having transitions recorded at a first frequency and a centerline that is in-line with a centerline of a data track.

14. The disk drive of claim 12, wherein the second set of servo bursts comprises at least one servo burst having transitions recorded at a second frequency and a centerline that is in-line with a centerline of a data track.

15. The disk drive of claim 12, wherein the first set of servo bursts comprises a first servo burst having transitions recorded at a first frequency and the second set of servo bursts comprises a second servo burst having transitions recorded at the first frequency, the first servo burst having a centerline that is in-line with a centerline of a data track, and the second servo burst having a centerline that is offset from the centerline of the data track by one-third of the data track pitch.

16. The disk drive of claim 12, wherein the first set of servo bursts comprises a first servo burst having transitions recorded at a first frequency and the second set of servo bursts comprises a second servo burst having transitions recorded at the first frequency, the second servo burst having a centerline that is in-line with a centerline of a data track, and the first servo burst having a centerline that is offset from the centerline of the data track by one-third of the data track pitch.

17. An electronic servo signal processing system for positioning a sensing head adjacent a surface of a moving magnetic storage medium for reading a servo pattern recorded in multiple tracks on the storage medium surface, the servo control system comprising:

(a) a servo demodulator that receives a servo signal and produces a position error sensing (PES) signal, wherein the received servo signal is generated by the sensing head from a servo pattern on the storage medium in a transducing direction and is produced from a sequence of servo pattern bursts comprising magnetic transitions defining a servo pattern having:

(1) a first set of servo bursts that extend generally radially across the surface of the magnetic storage medium, each servo burst in the first set having a width equal to that of data recorded in the data tracks and spaced apart radially from other servo bursts in the first set, each servo burst of the first set of servo bursts comprising transitions recorded at a frequency differing from a frequency of an adjacent servo burst of the first set; and (2) a second set of servo bursts extending generally radially across the surface of the magnetic storage medium angularly offset from the first set of servo bursts, each servo burst in the second set having a width equal to that of data recorded in the data tracks, each servo burst of the second set of servo bursts spaced apart radially from other servo bursts in the second set, each servo burst of the second set of servo bursts comprising transitions recorded at a frequency differing from a frequency of an adjacent servo burst of the second set, the servo bursts of the first and second sets of equal frequency offset from one another by one-third of the data track pitch; and (b) a servo controller that controls a servo assembly in accordance with the PES signal to maintain the sensing head centered relative to the servo track width.

18. The disk drive of claim 17, wherein the first set of servo bursts comprises at least one servo burst having transitions recorded at a first frequency and a centerline that is in-line with a centerline of a data track.

19. The electron servo signal processing system of claim 17, wherein the second set of servo bursts comprises at least one servo burst having transitions recorded at a second frequency and a centerline that is in-line with a centerline of a data track.

20. The electronic servo signal processing system of claim 17, wherein the first set of servo bursts comprises a first servo burst having transitions recorded at a first frequency and the second set of servo bursts comprises a second servo burst having transitions recorded at the first frequency, the first servo burst having a centerline that is in-line with a centerline of a data track, and the second servo burst having a centerline that is offset from the centerline of the data track by one-third of the data track pitch.

21. The electronic servo signal processing system of claim 17, wherein the first set of servo bursts comprises a first servo burst having transitions recorded at a first frequency and the second set of servo bursts comprises a second servo burst having transitions recorded at the first frequency, the second servo burst having a centerline that is in-line with a centerline of a data track, and the first servo burst having a centerline that is offset from the centerline of the data track by one-third of the data track pitch.

22. A magnetic disk for a direct access storage device, the magnetic disk having a servo pattern recorded on a surface thereof for positioning a transducer head relative to data tracks of the magnetic disk, the servo pattern comprising:

a first set of servo bursts that extend generally radially across the surface of the magnetic disk, each servo burst in the first set spaced apart radially from other servo bursts in the first set, each servo burst of the first set of servo bursts comprising transitions recorded at a frequency differing from a frequency of an adjacent servo burst of the first set; and a second set of servo bursts extending generally radially across the surface of the magnetic disk angularly offset from the first set of servo bursts, each servo burst in the second set spaced apart radially from other servo bursts in the second set, each servo burst of the second set of servo bursts comprising transitions recorded at a frequency differing from a frequency of an adjacent servo burst of the second set, the servo bursts of the first and second sets of equal frequency offset from one another by a predefined fraction of the data track pitch, wherein the first set of servo bursts includes a sequence of bursts comprising transitions respectively recorded at first, second, and third frequencies, and the second set of servo bursts includes a sequence of bursts comprising transitions respectively recorded at the first, second, and third frequencies.

23. The magnetic disk of claim 22, wherein the predefined fraction of the data track pitch is one-third of the data track pitch.

24. The magnetic disk of claim 22, wherein servo bursts of the first set of servo bursts comprising transitions recorded at the first frequency have a centerline that is in-line with a centerline of a data track.

25. The magnetic disk of claim 22, wherein servo bursts of the second set of servo bursts comprising transitions recorded at the second frequency have a centerline that is in-line with a centerline of a data track.

26. The magnetic disk of claim 22, wherein the first set of servo bursts comprises a first servo burst having transitions recorded at the first frequency and the second set of servo bursts comprises a second servo burst having transitions recorded at the first frequency, the first servo burst having a centerline that is in-line with a centerline of a data track, and the second servo burst having a centerline that is offset from the centerline of the data track by one-third of the data track pitch.

27. The magnetic disk of claim 22, wherein the first set of servo bursts comprises a first servo burst having transitions recorded at the first frequency and the second set of servo bursts comprises a second servo burst having transitions recorded at the first frequency, the second servo burst having a centerline that is in-line with a centerline of a data track, and the first servo burst having a centerline that is offset from the centerline of the data track by one-third of the data track pitch.

28. A disk drive, comprising:
(a) a magnetic storage media disk with a magnetic recording material deposited on a surface of the disk and on which is recorded servo pattern bursts comprising a sequence of magnetic transitions defining a servo pattern having:
  (1) a first set of servo bursts that extend generally radially across the surface of the magnetic disk, each servo burst in the first set spaced apart radially from other servo bursts in the first set, each servo burst of the first set of servo bursts comprising transitions recorded at a frequency differing from a frequency of an adjacent servo burst of the first set; and
  (2) a second set of servo bursts extending generally radially across the surface of the magnetic disk angularly offset from the first set of servo bursts, each servo burst in the second set spaced apart radially from other servo bursts in the second set, each servo burst of the second set of servo bursts comprising transitions recorded at a frequency differing from a frequency of an adjacent servo burst of the second set, the servo bursts of the first and second sets of equal frequency offset from one another by a predefined fraction of the data track pitch, wherein the first set of servo bursts includes a sequence of bursts comprising transitions respectively recorded at first, second, and third frequencies, and the second set of servo bursts includes a sequence of bursts comprising transitions respectively recorded at the first, second, and third frequencies;
(b) a sensing head that transduces the servo data and produces a servo signal;
(c) a servo demodulator that receives the servo signal, recognizes the servo burst pattern data, and produces a position error sensing (PES) signal; and
(d) a servo that moves the sensing head relative to the surface of the magnetic storage media disk in response to the PES signal.

29. The disk drive of claim 28, wherein the predefined fraction of the data track pitch is one-third of the data track pitch.

30. The disk drive of claim 28, wherein servo bursts of the first set of servo bursts comprising transitions recorded at the first frequency have a centerline that is in-line with a centerline of a data track.

31. The disk drive of claim 28, wherein servo bursts of the second set of servo bursts comprising transitions recorded at the second frequency have a centerline that is in-line with a centerline of a data track.

32. The disk drive of claim 28, wherein the first set of servo bursts comprises a first servo burst having transitions recorded at the first frequency and the second set of servo bursts comprises a second servo burst having transitions recorded at the first frequency, the first servo burst having a centerline that is in-line with a centerline of a data track, and the second servo burst having a centerline that is offset from the centerline of the data track by one-third of the data track pitch.

33. The disk drive of claim 28, wherein the first set of servo bursts comprises a first servo burst having transitions recorded at the first frequency and the second set of servo bursts comprises a second servo burst having transitions recorded at the first frequency, the second servo burst having a centerline that is in-line with a centerline of a data track, and the first servo burst having a centerline that is offset from the centerline of the data track by one-third of the data track pitch.

34. An electronic servo signal processing system for positioning a sensing head adjacent a surface of a moving magnetic storage medium for reading a servo pattern recorded in multiple tracks on the storage medium surface, the servo control system comprising:
(a) a servo demodulator that receives a servo signal and produces a position error sensing (PES) signal, wherein the received servo signal is generated by the sensing head from a servo pattern on the storage medium in a transducing direction and is produced from a sequence of servo pattern bursts comprising magnetic transitions defining a servo pattern having:
  (1) a first set of servo bursts that extend generally radially across the surface of the magnetic storage medium, each servo burst in the first set spaced apart radially from other servo bursts in the first set, each servo burst of the first set of servo bursts comprising transitions recorded at a frequency differing from a frequency of an adjacent servo burst of the first set; and
  (2) a second set of servo bursts extending generally radially across the surface of the magnetic storage medium angularly offset from the first set of servo bursts, each servo burst in the second set spaced apart radially from other servo bursts in the second set, each servo burst of the second set of servo bursts comprising transitions recorded at a frequency differing from a frequency of an adjacent servo burst of the second set, the servo bursts of the first and second sets of equal frequency offset from one another by a predefined fraction of the data track pitch, wherein the first set of servo bursts includes a sequence of bursts comprising transitions respectively recorded at first, second, and third frequencies, and the second set of servo bursts includes a sequence of bursts comprising transitions respectively recorded at the first, second, and third frequencies; and
(b) a servo controller that controls a servo assembly in accordance with the PES signal to maintain the sensing head centered relative to the servo track width.

35. The system of claim 34, wherein the predefined fraction of the data track pitch is one-third of the data track pitch.

36. The electronic servo signal processing system of claim 34, wherein servo bursts of the first set of servo bursts comprising transitions recorded at the first frequency have a centerline that is in-line with a centerline of a data track.

37. The electronic servo signal processing system of claim 34, wherein servo bursts of the second set of servo bursts comprising transitions recorded at the second frequency have a centerline that is in-line with a centerline of a data track.

38. The electronic servo signal processing system of claim 34, wherein the first set of servo bursts comprises a first servo burst having transitions recorded at the first frequency and the second set of servo bursts comprises a second servo burst having transitions recorded at the first frequency, the first servo burst having a centerline that is in-line with a centerline of a data track, and the second servo burst having a centerline that is offset from the centerline of the data track by one-third of the data track pitch.

39. The electronic servo signal processing system of claim 34, wherein the first set of servo bursts comprises a first servo burst having transitions recorded at the first frequency and the second set of servo bursts comprises a second servo burst having transitions recorded at the first frequency, the second servo burst having a centerline that is in-line with a centerline of a data track, and the first servo burst having a centerline that is offset from the centerline of the data track by one-third of the data track pitch.

* * * * *

UNITED STATES PATENT AND TRADEMARK OFFICE
CERTIFICATE OF CORRECTION

PATENT NO. : 6,760,184 B1
DATED : July 6, 2004
INVENTOR(S) : Cunningham

It is certified that error appears in the above-identified patent and that said Letters Patent is hereby corrected as shown below:

Title page,
Item [73], Assignee, "Hitachi Global Storage Technologies (NL)" should read
-- Hitachi Global Storage Technologies Netherlands B.V. --.

Column 8,
Line 58, "head width as 2 function" should read -- head width as a function --.

Column 19,
Line 67, "18. The disk drive of claim 17," should read -- 18. The electronic servo signal processing system of claim 17, --.

Column 20,
Line 3, "19. The electron servo signal" should read -- 19. The electronic servo signal --.

Signed and Sealed this

Twenty-eighth Day of December, 2004

JON W. DUDAS
*Director of the United States Patent and Trademark Office*